(12) United States Patent
Wahadaniah et al.

(10) Patent No.: US 8,923,404 B2
(45) Date of Patent: Dec. 30, 2014

(54) IMAGE CODING METHOD, IMAGE DECODING METHOD, IMAGE CODING APPARATUS, AND IMAGE DECODING APPARATUS

(71) Applicant: Panasonic Intellectual Property Corporation of America, Torrance, CA (US)

(72) Inventors: Viktor Wahadaniah, Singapore (SG); Chong Soon Lim, Singapore (SG); Sue Mon Thet Naing, Singapore (SG); Hai Wei Sun, Singapore (SG); Toshiyasu Sugio, Osaka (JP); Takahiro Nishi, Nara (JP); Hisao Sasai, Osaka (JP); Youji Shibahara, Osaka (JP); Kyoko Tanikawa, Osaka (JP); Toru Matsunobu, Osaka (JP); Kengo Terada, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/456,006

(22) Filed: Aug. 11, 2014

(65) Prior Publication Data

US 2014/0348244 A1    Nov. 27, 2014

Related U.S. Application Data

(60) Continuation of application No. 14/027,406, filed on Sep. 16, 2013, now Pat. No. 8,855,208, which is a division of application No. 13/659,950, filed on Oct. 25, 2012.

(60) Provisional application No. 61/552,147, filed on Oct. 27, 2011.

(51) Int. Cl.
*H04N 7/36* (2006.01)
*H04N 19/51* (2014.01)
*H04N 19/583* (2014.01)
*H04N 7/32* (2006.01)

(52) U.S. Cl.
CPC ... *H04N 19/00684* (2013.01); *H04N 19/00733* (2013.01)
USPC ................................. 375/240.16; 375/240.15

(58) Field of Classification Search
USPC ........................................ 375/240.15, 240.16
See application file for complete search history.

(56) References Cited

U.S. PATENT DOCUMENTS 8,582,651 B2 * 11/2013 Jeon ........................ 375/240.16

(Continued)

FOREIGN PATENT DOCUMENTS

JP     2003-333602     11/2003

OTHER PUBLICATIONS

International Search Report issued Dec. 4, 2012 in International (PCT) Application No. PCT/JP2012/006651.

(Continued)

*Primary Examiner* — Tung Vo
*Assistant Examiner* — Obafemi Sosanya
(74) *Attorney, Agent, or Firm* — Wenderoth, Lind & Ponack, L.L.P.

(57) ABSTRACT

An image coding method includes: deriving a candidate for a motion vector predictor from a neighboring motion vector; adding the candidate to a list; selecting a motion vector predictor from the list; coding a current block; and coding a current motion vector. In the deriving, the candidate is derived according to a first derivation scheme when each of a current reference picture and a neighboring reference picture is determined to be a long-term reference picture, and the candidate is derived according to a second derivation scheme when each of a current reference picture and a neighboring reference picture is determined to be a short-term reference picture.

4 Claims, 34 Drawing Sheets

(56) References Cited

U.S. PATENT DOCUMENTS

| | | | |
|---|---|---|---|
| 2003/0202605 A1 | 10/2003 | Hazra et al. | |
| 2003/0206589 A1* | 11/2003 | Jeon | 375/240.15 |
| 2004/0252764 A1* | 12/2004 | Hur et al. | 375/240.16 |
| 2013/0077677 A1* | 3/2013 | Wang et al. | 375/240.12 |

OTHER PUBLICATIONS

International Search Report issued Dec. 4, 2012 in International (PCT) Application No. PCT/JP2012/006674.
ISO/IEC 14496-10 (MPEG-4 Part10: Advanced Video Coding), Oct. 1, 2004.
International Search Report issued Dec. 4, 2012 in corresponding International (PCT) Application No. PCT/JP2012/006684.
Joel Jung and Guilaume Laroche, "Competition-Based Scheme for Motion Vector Selection and Coding", ITU-Telecommunications Standardization Sector Study Group 16 Question 6 Video Coding Experts Group (VCEG) $29^{th}$ Meeting: Klagenfurt, Austria, Document VCEG-AC06, ITU-T, Jul. 2006.
Rickard Sjöberg and Jonatan Samuelsson, "Absolute signaling of reference pictures", Joint Collaborative Team on Video Coding (JCT-VC) of ITU-T SG16 WP3 and ISO/IEC JTC1/SC29/WG11, JCTVC-F493, 6th Meeting: Torino, IT, Jul. 14-22, 2011.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d4, Ver.5, 6th Meeting: Torino, IT, Jul. 14-22, 2011.
Office Action issued Feb. 26, 2014 in U.S. Appl. No. 13/660,245.
Office Action issued Mar. 25, 2014 in U.S. Appl. No. 13/660,507.

* cited by examiner

FIG. 22

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

Data structure of PMT

FIG. 33

| Corresponding standard | Driving frequency |
|---|---|
| MPEG-4 AVC | 500 MHz |
| MPEG-2 | 350 MHz |
| ⋮ | ⋮ |

IMAGE CODING METHOD, IMAGE DECODING METHOD, IMAGE CODING APPARATUS, AND IMAGE DECODING APPARATUS

FIELD

One or more exemplary embodiments disclosed herein relate to an image coding method for coding each of the blocks of pictures.

BACKGROUND

One exemplary technique for coding each of the blocks of pictures is the technique disclosed in Non-patent Literature 1.

CITATION LIST

Non Patent Literature

ISO/IEC 14496-10 "MPEG-4 Part 10 Advanced Video Coding"

SUMMARY

Technical Problem

However, in some cases, the conventional image coding method cannot achieve a sufficiently high coding efficiency.

One non-limiting and exemplary embodiment provides an image coding method which achieves an increased image coding efficiency.

Solution to Problem

An image coding method according to an aspect of the present disclosure is an image coding method of coding each of blocks of pictures, the image coding method including: deriving a candidate for a motion vector predictor to be used in coding of a motion vector for a current block to be coded, from a motion vector for a neighboring block which is included in a current picture including the current block and is adjacent to the current block; adding the derived candidate to a list; selecting the motion vector predictor from the list including the added candidate; and coding the current block using the motion vector for the current block and a reference picture for the current block, and coding the motion vector for the current block using the selected motion vector predictor; wherein, in the deriving: whether the reference picture for the current block is a long-term reference picture or a short-term reference picture is determined, and whether a reference picture for the neighboring block is a long-term reference picture or a short-term reference picture is determined; and when each of the reference picture for the current block and the reference picture for the neighboring block is determined to be a long-term reference picture, the candidate is derived from the motion vector for the neighboring block according to a first derivation scheme which does not involve scaling based on a temporal distance, and when each of the reference picture for the current block and the reference picture for the neighboring block is determined to be a short-term reference picture, the candidate is derived from the motion vector for the neighboring block according to a second derivation scheme which involves scaling based on a temporal distance.

These general and specific aspects may be implemented using a system, an apparatus, an integrated circuit, a computer program, or a computer-readable recording medium such as a CD-ROM, or any combination of systems, apparatuses, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The image coding method disclosed herein achieves an increased image coding efficiency.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 22 illustrates a structure of multiplexed data.

FIG. 33 shows an example of a look-up table in which video data standards are associated with driving frequencies.

Figure 1:
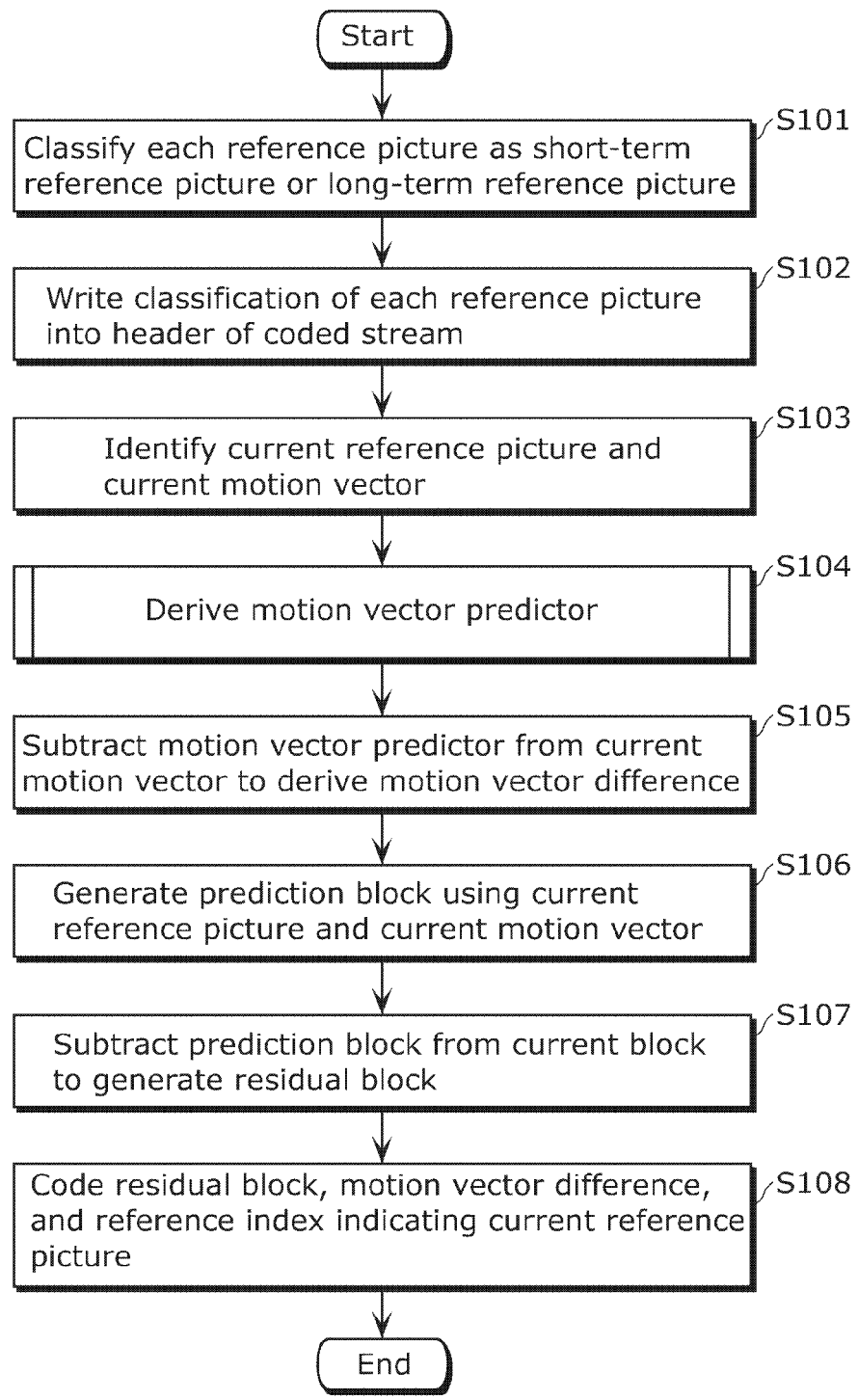
FIG. 1 is a flowchart of operations performed by an image coding apparatus according to a reference example.

DESCRIPTION OF EMBODIMENTS (Underlying Knowledge Forming Basis of the Present Disclosure)

In relation to the image coding method disclosed in the Background section, the inventors have found a problem indicated below. It is to be noted hereinafter that an image may refer to any one of a video made up of a plurality of pictures, a still image made up of a single picture, a part of a picture, and the like.

Examples of the recent image coding schemes include the MPEG-4 AVC/H.264 and High Efficiency Video Coding (HEVC). These image coding schemes support inter prediction based on coded reference pictures.

In addition, these image coding schemes may use reference pictures called long-term reference pictures. For example, a reference picture may be used as a long-term reference picture when the reference picture is held for a long period in a Decoded Picture Buffer (DPB).

In addition, the HEVC supports a mode called Adaptive Motion Vector Prediction (AMVP). In the AMVP mode, a motion vector predictor obtainable by predicting a motion vector for a current block based on, for example, a motion vector for a neighboring block is used in the coding of the motion vector for the current block.

Furthermore, the HEVC supports spatial motion vector predictor. The spatial motion vector predictor is derived from the motion vector for the neighboring block. The neighboring block is included in the current picture including a current block to be coded, and is adjacent to the current block. For example, the spatial motion vector predictor may be derived from a motion vector for a left neighboring block located left to the current block, or may be derived from a motion vector for an upper neighboring block located above the current block.

Here, the spatial motion vector predictor derived from the motion vector for the left neighboring block is referred to as a left motion vector predictor. Likewise, the spatial motion vector predictor derived from the motion vector for the upper neighboring block is referred to as an upper motion vector predictor.

In addition, a motion vector of a neighboring block may be referred to as a neighboring motion vector. In addition, a reference picture for a neighboring block may be referred to as a neighboring reference picture. The neighboring block is coded using the neighboring motion vector and the neighboring reference picture.

Likewise, the motion vector for the current block may be referred to as a current motion vector. In addition, the reference picture for the current block may be referred to as a current reference picture. The current block is coded using the current motion vector and the current reference picture.

Each of the current block and the neighboring block is a Prediction Unit (PU). The prediction unit is an image block and is defined as a data unit in prediction. The HEVC defines a Coding Unit (CU) as a data unit in coding separately from the prediction unit. The prediction unit is a block in the coding unit. A block disclosed hereinafter may be replaced by a prediction unit or a coding unit.

The sizes of the coding unit and the prediction unit are not constant. For example, a picture may include a plurality of coding units having various sizes, and/or may include a plurality of prediction units having various sizes.

For this reason, in some cases, it is impossible to accurately define any of the neighboring blocks located to the left or above a current block. Accordingly, the HEVC supports a predetermined selection scheme of selecting the left block and the upper block from a plurality of blocks adjacent to the current block.

The spatial motion vector predictor is generated by scaling the motion vectors for the selected neighboring blocks according to a picture order count (POC) distance. A POC is an ordinal number assigned to a picture in display order. A POC distance corresponds to the temporal distance between two pictures. Scaling based on a POC distance is also referred to as POC-based scaling. Expression 1 shown below is an operational expression for POC-based scaling on the motion vector for the neighboring blocks.

$$Pmv = (tb/td) \times nmv \qquad \text{(Expression 1)}$$

Here, nmv denotes the motion vector for the neighboring block; pmv denotes a spatial motion vector predictor derived from the motion vector for the neighboring block; tb denotes a signed POC distance and is a difference from the current picture to the current reference picture; and td denotes a signed POC distance and is a difference from the current picture to the neighboring reference picture.

When an effective spatial motion vector predictor exists, the spatial motion vector predictor is included in an ordered list of candidates for motion vector predictors. A motion vector predictor to be used in the coding of the current motion vector is selected from the ordered list of candidates for the motion vector predictors. The selected motion vector predictor is shown as a parameter in a coded stream.

FIG. 1 is a flowchart of operations performed by an image coding apparatus according to a reference example. FIG. 1 specifically shows steps of coding an image using inter prediction.

First, the image coding apparatus classifies each of reference pictures as a short-term reference picture or as a long-term reference picture (S101). The image coding apparatus writes information indicating the classification of each of the reference pictures in the header of the coded stream (S102).

Next, the coding apparatus identifies a current reference picture and a current motion vector using motion estimation (S103). Next, the coding apparatus derives a motion vector predictor (S104). These derivation steps are described in detail later.

Next, the image coding apparatus subtracts the motion vector predictor from the current motion vector to derive a motion vector difference (S105). Next, the image coding apparatus performs motion compensation using the current reference picture and the current motion vector to generate a prediction block (S106).

Next, the image coding apparatus subtracts the prediction block from the current block to generate a residual block (S107). Lastly, the image coding apparatus codes the residual block, the motion vector difference, and a reference index indicating the current reference picture to generate a coded stream including these data items (S108).

Figure 2:
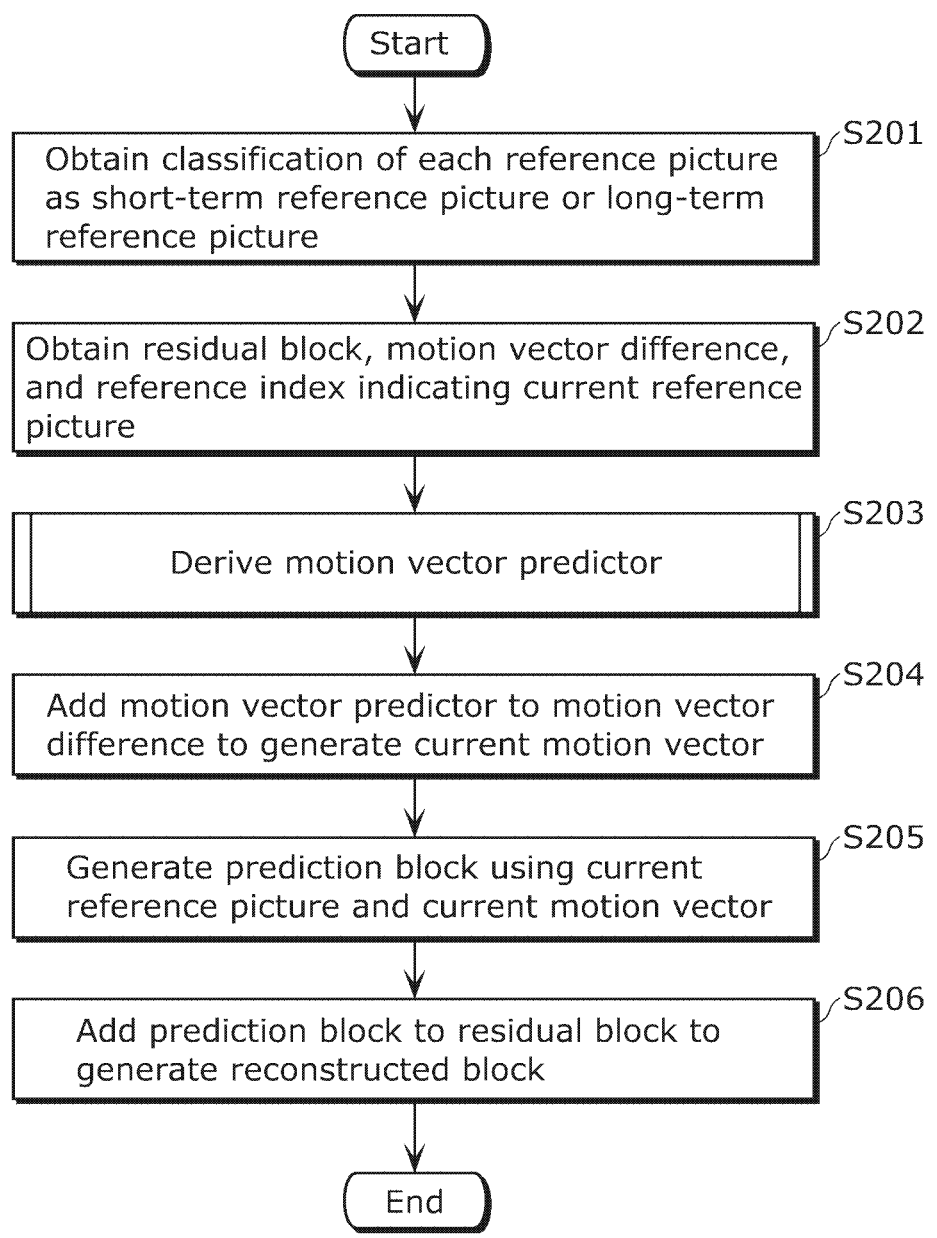
FIG. 2 is a flowchart of operations performed by an image decoding apparatus according to the reference example.

FIG. 2 is a flowchart of operations performed by an image decoding apparatus according to the reference example. FIG. 2 specifically shows steps of decoding an image using inter prediction.

First, the image decoding apparatus obtains the coded stream, and obtains information indicating the classification of each of the reference pictures by parsing the header of the coded stream (S201). In addition, the image decoding apparatus obtains the residual block, the motion vector difference, and the reference index indicating the current reference picture by parsing the coded stream (S202).

Next, the image decoding apparatus derives a motion vector predictor (S203). These derivation steps are described in detail later. Next, the image decoding apparatus adds the motion vector predictor to the motion vector difference to generate a current motion vector (S204). Next, the image decoding apparatus performs motion compensation using the current reference picture and the current motion vector to generate a prediction block (S205). Lastly, the image decoding apparatus adds the prediction block to the residual block to generate a reconstructed block (S206).

Figure 3:
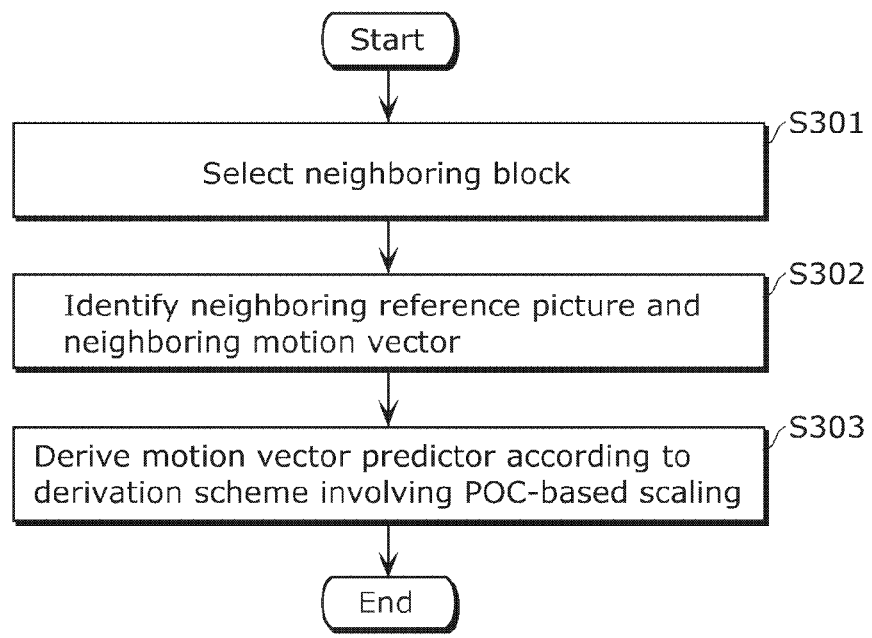
FIG. 3 is a flowchart of derivation steps of a derivation process according to the reference example.

FIG. 3 is a flowchart of steps of a derivation process shown in FIG. 1 and FIG. 2. Operations performed by the image coding apparatus are shown below. Operations performed by the image decoding apparatus are similar to operations performed by the image coding apparatus. Thus, "coding" may be replaced by "decoding" in the descriptions below.

First, the image coding apparatus selects a neighboring block adjacent to a current block to be coded (S301). The image coding apparatus identifies a neighboring reference picture and a neighboring motion vector (S302). Next, the image coding apparatus derives a motion vector predictor according to a derivation scheme involving POC-based scaling (S303).

Figure 4:
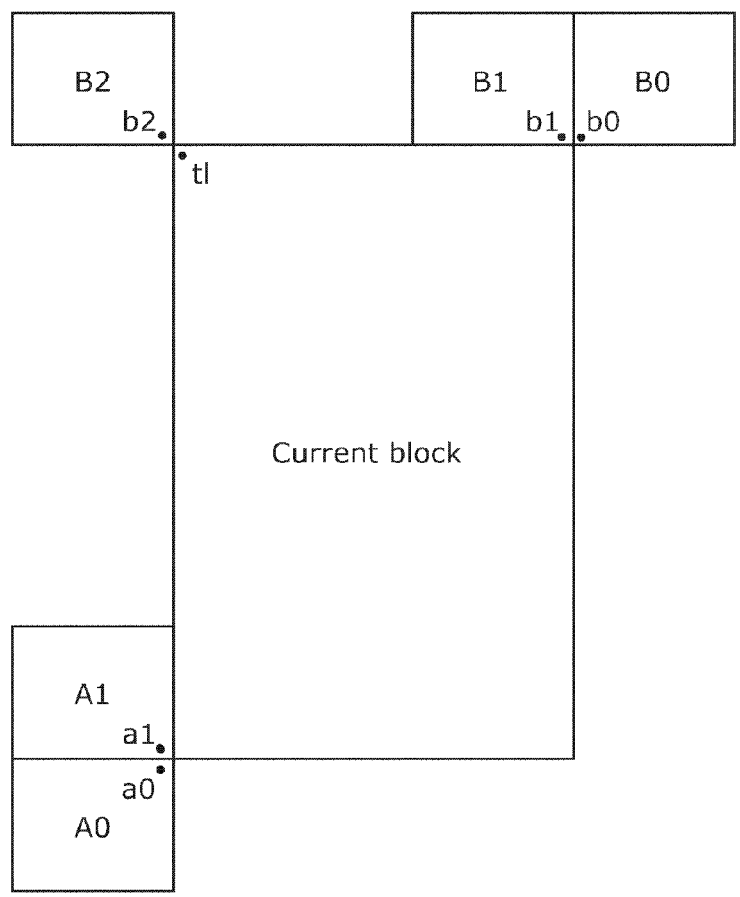
FIG. 4 is an illustration of a current block and neighboring blocks according to the reference example.

FIG. 4 is an illustration of neighboring blocks to be used in the derivation process shown in FIG. 3. The neighboring blocks are selected from among a plurality of blocks adjacent to the current block.

Each of a block A0 including a sample a0 and a block A1 including a sample a1 is a candidate for a left neighboring block. Each of a block B0 including a sample b0, a block B1 including a sample b1, and a block B2 including a sample b2 is a candidate for an upper neighboring block.

When the coordinates of a sample (pixel) tl located at the upper-left corner of a current block are denoted as (x, y) and the width of the current block is denoted as w, and the height of the current block is denoted as h, the coordinates of a sample a0 located at a position facing the lower-left corner of the current block are denoted as (x−1, y+h). In this case, the coordinates of a sample a1 located to the left of the lower-left corner of the current block are denoted as (x−1, y+h−1). In this case, the coordinates of a sample b0 located at a position facing the upper-right corner of the current block are denoted as (x+w, y−1). In this case, the coordinates of a sample b1 located above the right corner of the current block are denoted as (x+w−1, y−1). In this case, the coordinates of a sample b2 located at a position facing the upper-left corner of the current block are denoted as (x−1, y−1).

An available one of the blocks A0 and A1 is selected as a left neighboring block. An available one of the blocks B0, B1 and B2 is selected as an upper neighboring block. Exemplary cases where a block in a picture cannot be used include a case where no such block exists in the picture and a case where the block is an intra-prediction coded block.

Referring to FIG. 3 again, a description is given of derivation steps of deriving a spatial motion vector predictor.

First, an image coding apparatus sets a left motion vector predictor as being unavailable. Next, the image coding apparatus tries to detect a block coded with reference to a current reference picture from the blocks A0 and A1 in FIG. 4. When the image coding apparatus successfully detects such a block coded with reference to a current reference picture, the image coding apparatus derives a motion vector for the block as the left motion vector predictor without scaling. Next, the image coding apparatus sets the left motion vector predictor as being available.

When the image coding apparatus does not successfully detect such a block coded with reference to a current reference picture, the image coding apparatus tries to detect a block coded using inter prediction from the blocks A0 and A1 (S301). When the image coding apparatus successfully detects such an inter-prediction coded block, the image coding apparatus performs scaling based on a picture order count (POC) on a motion vector for the block to derive a left motion vector predictor, and sets the derived left motion vector predictor as being available (S302 and S303).

When the image coding apparatus does not successfully detect such an inter-prediction coded block, the image coding apparatus maintains the left motion vector predictor as being unavailable.

Next, the image coding apparatus sets an upper motion vector predictor as being unavailable. Next, the image coding apparatus tries to detect a block coded with reference to a current reference picture from the blocks B0, B1, and B2 in FIG. 4. When the coding apparatus successfully detects such a block coded with reference to a current reference picture, the image coding apparatus derives a motion vector for the block as the upper motion vector predictor without scaling. Next, the image coding apparatus sets the upper motion vector predictor as being available.

When the image coding apparatus does not successfully detect such a block coded with reference to a current reference picture, the image coding apparatus tries to detect a block coded using inter prediction from the blocks B0, B1, and B2 (S301). When the image coding apparatus successfully detects such an inter-prediction coded block, the image coding apparatus performs scaling based on a picture order count (POC) on a motion vector for the block to derive an upper motion vector predictor, and sets the derived upper motion vector predictor as being available (S302 and S303). When the inter predicting unit 511 does not successfully detect such an inter-prediction coded block, the image coding apparatus maintains the upper motion vector predictor as being unavailable.

According to the above-described derivation process, the image coding apparatus (the image decoding apparatus) derives the available motion vector predictors (the left motion vector predictor and the upper motion vector predictor).

However, it may be difficult to derive appropriate spatial motion vector predictors depending on the relationships between a current picture, a current reference picture, and a neighboring reference picture.

For example, when a current reference picture is a long-term reference picture, the temporal distance from the current reference picture to a current picture may be long. On the other hand, when a neighboring reference picture is a long-term reference picture, the temporal distance from the neighboring reference picture to a current picture may be long.

In these cases, POC-based scaling may yield extremely large or small spatial motion vector predictors. In this way, the prediction accuracy is reduced, and the coding efficiency is reduced. In particular, the use of a fixed number of bits results in significant reduction in the prediction accuracy and coding efficiency because it is impossible to accurately express such extremely large or small spatial motion vector predictors using such a fixed number of bits.

In order to solve the aforementioned problems, an image coding method according to an aspect of the present disclosure is an image coding method of coding each of blocks of pictures, the image coding method including: deriving a candidate for a motion vector predictor to be used in coding of a motion vector for a current block to be coded, from a motion vector for a neighboring block which is included in a current picture including the current block and is adjacent to the current block; adding the derived candidate to a list; selecting the motion vector predictor from the list including the added candidate; and coding the current block using the motion vector for the current block and a reference picture for the current block, and coding the motion vector for the current block using the selected motion vector predictor; wherein, in the deriving: whether the reference picture for the current block is a long-term reference picture or a short-term reference picture is determined, and whether a reference picture for the neighboring block is a long-term reference picture or a short-term reference picture is determined; and when each of the reference picture for the current block and the reference picture for the neighboring block is determined to be a long-term reference picture, the candidate is derived from the motion vector for the neighboring block according to a first derivation scheme which does not involve scaling based on a temporal distance, and when each of the reference picture for the current block and the reference picture for the neighboring block is determined to be a short-term reference picture, the candidate is derived from the motion vector for the neighboring block according to a second derivation scheme which involves scaling based on a temporal distance.

In this way, it is possible to appropriately derive the candidate for the motion vector predictor without deriving any extremely large or small candidate. This makes it possible to increase the prediction accuracy, and to thereby increase the coding efficiency.

For example, in the deriving of the image coding method according to the aspect: the deriving of the candidate from the motion vector for the neighboring block may not be performed when one of the reference picture for the current block and the reference picture for the neighboring block is determined to be a long-term reference picture, and the other is determined to be a short-term reference picture; and the deriving of the candidate from the motion vector for the neighboring block may be performed when each of the reference picture for the current block and the reference picture for the neighboring block is determined to be a long-term reference picture or when each of the reference picture for the current block and the reference picture for the neighboring block is determined to be a short-term reference picture.

In this way, when it is predicted that a low prediction accuracy is yielded, no candidate for the motion vector predictor is derived from the motion vector for the neighboring block. This prevents that such a low prediction accuracy is yielded.

In addition, for example, in the coding of the image coding method according to the aspect, first information and second information may be further coded, the first information indicating whether the reference picture for the current block is a long-term reference picture or a short-term reference picture, and the second information indicating whether the reference picture for the neighboring block is a long-term reference picture or a short-term reference picture.

In this way, the information indicating whether each reference picture is a long-term reference picture or a short-term reference picture is forwarded by the coding side to the decoding side. Accordingly, the coding side and the decoding side can obtain the similar determination result and perform the similar processes.

In addition, for example, in the deriving of the image coding method according to the aspect, whether the reference picture for the current block is a long-term reference picture or a short-term reference picture may be determined based on a temporal distance from the reference picture for the current block to the current picture; and whether the reference picture for the neighboring block is a long-term reference picture or a short-term reference picture may be determined based on a temporal distance from the reference picture for the neighboring block to the current picture.

In this way, whether each reference picture is a long-term reference picture or a short-term reference picture is appropriately determined based on the temporal distance in a simple manner.

In addition, for example, in the deriving of the image coding method according to the aspect, whether the reference picture for the neighboring block is a long-term reference picture or a short-term reference picture may be determined in a period in which the neighboring block is coded.

In this way, it is possible to determine whether the reference picture for the neighboring block is a long-term reference picture or a short-term reference picture more accurately In addition, for example, in the deriving of the image coding method according to the aspect, whether the reference picture for the neighboring block is a long-term reference picture or a short-term reference picture may be determined in a period in which the current block is coded.

In this way, there is no need to maintain, for a long time, the information indicating whether the reference picture for the neighboring block is a long-term reference picture or a short-term reference picture.

In addition, for example, in the deriving of the image coding method according to the aspect, the motion vector for the neighboring block may be derived as the candidate when each of the reference picture for the current block and the reference picture for the neighboring block is determined to be a long-term reference picture; and a scaled motion vector may be derived as the candidate, the scaled motion vector being obtained by scaling the motion vector for the neighboring block using a ratio of a temporal distance from the reference picture for the current block to the current picture with respect to a temporal distance from the reference picture for the neighboring block to the current picture, when each of the reference picture for the current block and the reference picture for the neighboring block is determined to be a short-term reference picture.

In this way, scaling of a motion vector is skipped when both the two reference pictures are long-term reference pictures, which reduces the amount of operation. On the other hand, when both the two reference pictures are short-term pictures, the candidate for the motion vector predictor is appropriately derived based on the temporal distances.

In addition, for example, in the deriving of the image coding method according to the aspect, when the reference picture for the current block is determined to be a short-term reference picture and the reference picture for the neighboring block is determined to be a long-term reference picture, the deriving of the candidate from the motion vector for the neighboring block may not be performed, another neighboring block coded with reference to a short-term reference picture may be selected, and the candidate may be derived from a motion vector for the other neighboring block according to the second derivation scheme.

Accordingly, a block for deriving a candidate which yields a high prediction accuracy is selected. Accordingly, the prediction accuracy is increased.

An image decoding method according to an aspect of the present disclosure is an image decoding method of decoding each of blocks of pictures, the image decoding method including: deriving a candidate for a motion vector predictor to be used in decoding of a motion vector for a current block to be decoded, from a motion vector for a neighboring block which is included in a current picture including the current block and is adjacent to the current block; adding the derived candidate to a list; selecting the motion vector predictor from the list including the added candidate; and decoding the motion vector for the current block using the selected motion vector predictor, and decoding the current block using the motion vector for the current block and a reference picture for the current block, wherein, in the deriving: whether the reference picture for the current block is a long-term reference picture or a short-term reference picture is determined, and whether the reference picture for the neighboring block is a long-term reference picture or a short-term reference picture is determined; and when each of the reference picture for the current block and the reference picture for the neighboring block is determined to be a long-term reference picture, the candidate is derived from the motion vector for the neighboring block according to a first derivation scheme which does not involve scaling based on a temporal distance, and when each of the reference picture for the current block and the reference picture for the neighboring block is determined to be a short-term reference picture, the candidate is derived from the motion vector for the neighboring block according to a second derivation scheme which involves scaling based on a temporal distance.

In this way, it is possible to appropriately derive the candidate for the motion vector predictor without deriving any extremely large or small candidate. This makes it possible to increase the prediction accuracy, and to thereby increase the coding efficiency.

For example, in the deriving of the image decoding method according to the aspect: the deriving of the candidate from the motion vector for the neighboring block may not be performed when one of the reference picture for the current block and the reference picture for the neighboring block is determined to be a long-term reference picture, and the other is determined to be a short-term reference picture; and the deriving of the candidate from the motion vector for the neighboring block may be performed when each of the reference picture for the current block and the reference picture for the neighboring block is determined to be a long-term reference picture or when each of the reference picture for the current block and the reference picture for the neighboring block is determined to be a short-term reference picture.

In this way, when it is predicted that a low prediction accuracy is yielded, no candidate for the motion vector predictor is derived from the motion vector for the neighboring block. This prevents that such a low prediction accuracy is yielded.

In addition, for example, in the decoding of the image decoding method according to the aspect, first information and second information may be further decoded, the first information indicating whether the reference picture for the current block is a long-term reference picture or a short-term reference picture, and the second information indicating whether the reference picture for the neighboring block is a long-term reference picture or a short-term reference picture, and in the deriving: whether the reference picture for the current block is a long-term reference picture or a short-term reference picture may be determined based on the information indicating whether the reference picture for the current block is a long-term reference picture or a short-term reference picture; and whether the reference picture for the neighboring block is a long-term reference picture or the short-term reference picture may be determined based on the information indicating whether the reference picture for the neighboring block is a long-term reference picture or a short-term reference picture.

In this way, the information indicating whether each reference picture is a long-term reference picture or a short-term reference picture is forwarded by the coding side to the decoding side. Accordingly, the coding side and the decoding side can obtain a similar determination result and perform the similar processes.

In addition, for example, in the deriving of the image decoding method according to the aspect, whether the reference picture for the current block is a long-term reference picture or a short-term reference picture may be determined based on a temporal distance from the reference picture for the current block to the current picture; and whether the reference picture for the neighboring block is a long-term reference picture or a short-term reference picture may be determined based on a temporal distance from the reference picture for the neighboring block to the current picture.

In this way, whether each reference picture is a long-term reference picture or a short-term reference picture is appropriately determined based on the temporal distance in a simple manner.

In addition, for example, in the deriving of the image decoding method according to the aspect, whether the reference picture for the neighboring block is a long-term reference picture or a short-term reference picture may be determined in a period in which the neighboring block is decoded.

In this way, it is possible to determine whether the reference picture for the neighboring block is a long-term reference picture or a short-term reference picture more accurately In addition, for example, in the deriving of the image decoding method according to the aspect, whether the reference picture for the neighboring block is a long-term reference picture or a short-term reference picture may be determined in a period in which the current block is decoded.

In this way, there is no need to maintain, for a long time, the information indicating whether the reference picture for the neighboring block is a long-term reference picture or a short-term reference picture.

In addition, for example, in the deriving of the image decoding method according to the aspect, the motion vector for the neighboring block may be derived as the candidate when each of the reference picture for the current block and the reference picture for the neighboring block is determined to be a long-term reference picture; and a scaled motion vector may be derived as the candidate, the scaled motion vector being obtained by scaling the motion vector for the neighboring block using a ratio of a temporal distance from the reference picture for the current block to the current picture with respect to a temporal distance from the reference picture for the neighboring block to the current picture, when each of the reference picture for the current block and the reference picture for the neighboring block is determined to be a short-term reference picture.

In this way, scaling of a motion vector is skipped when both the two reference pictures are long-term pictures, which reduces the amount of operation. On the other hand, when both the two reference pictures are short-term pictures, candidates for the motion vector predictors are appropriately derived based on the temporal distances.

In addition, for example, in the deriving of the image decoding method according to the aspect, when the reference picture for the current block is determined to be a short-term reference picture and the reference picture for the neighboring block is determined to be a long-term reference picture, the deriving of the candidate from the motion vector for the neighboring block may not be performed, another neighboring block coded with reference to a short-term reference picture may be selected, and the candidate may be derived from a motion vector for the other neighboring block according to the second derivation scheme.

Accordingly, a block for deriving a candidate which yields a high prediction accuracy is selected. Accordingly, the prediction accuracy is increased.

In addition, a content supply method according to an aspect of the present disclosure is a content supply method for allowing a server storing image data coded using the image coding method according to the aspect to transmit the image data in response to a request from an outside terminal.

These general and specific aspects may be implemented using a system, an apparatus, an integrated circuit, a computer program, or a computer-readable recording medium such as a CD-ROM, or any combination of systems, apparatuses, methods, integrated circuits, computer programs, or computer-readable recording media.

Hereinafter, certain exemplary embodiments are described in greater detail with reference to the accompanying Drawings. Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

Figure 5:
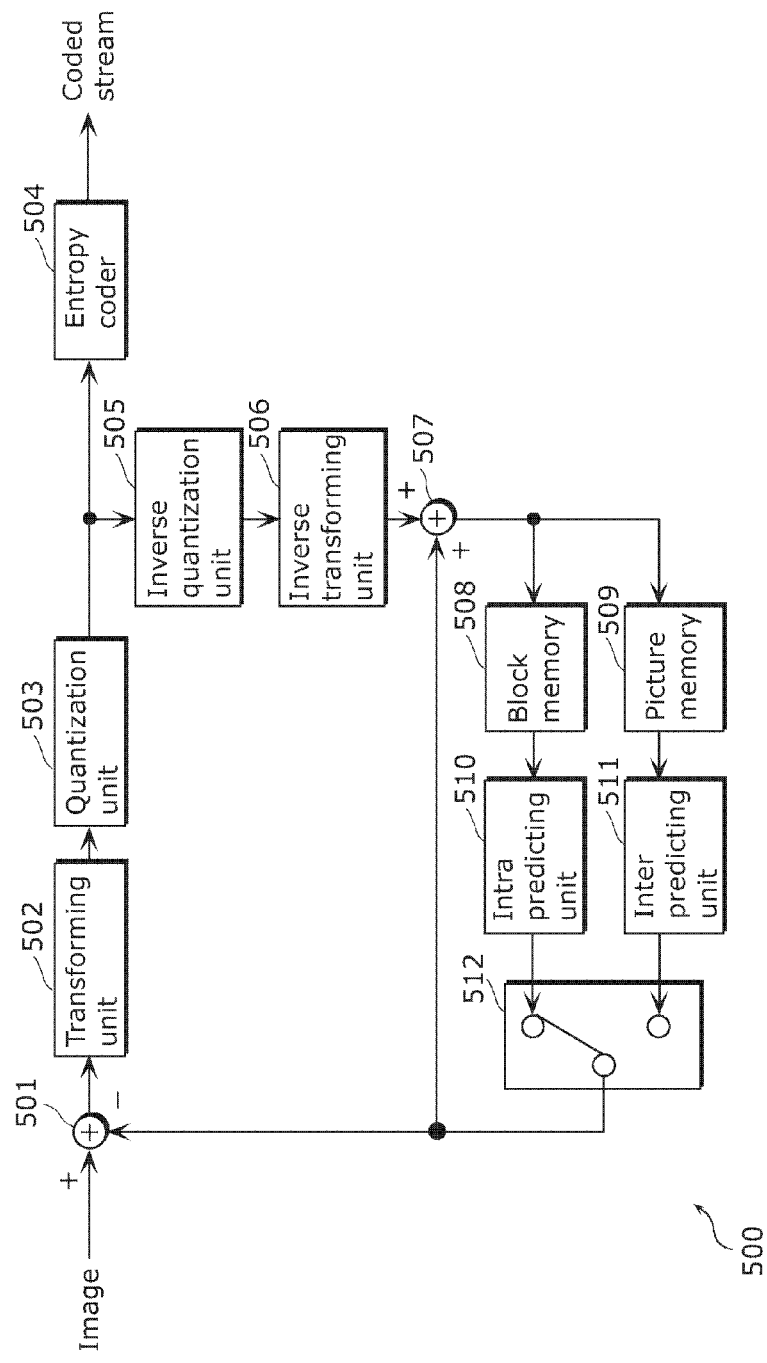
FIG. 5 is a block diagram of an image coding apparatus according to Embodiment 1 of the present disclosure.

FIG. 5 is a block diagram of an image coding apparatus 500 according to Embodiment 1. The image coding apparatus 500 in FIG. 5 codes images on a block-by-block basis, and outputs a coded stream including the coded images. More specifically, the image coding apparatus 500 includes: a subtracting unit 501, a transforming unit 502, a quantization unit 503, an entropy coder 504, an inverse quantization unit 505, an inverse transforming unit 506, an adding unit 507, a block memory 508, a picture memory 509, an intra predicting unit 510, an inter predicting unit 511, and a selecting unit 512.

The subtracting unit 501 subtracts a prediction image from an image input to the image coding apparatus 500, and outputs the difference image. The transforming unit 502 performs frequency transform on the difference image output from the subtracting unit 501 to generate a plurality of frequency coefficients. The quantization unit 503 quantizes the plurality of frequency coefficients generated by the transforming unit 502 to generate a plurality of quantized coefficients. The entropy coder 504 codes the plurality of quantized coefficients generated by the quantization unit 503 to generate a coded stream.

The inverse quantization unit 505 performs inverse quantization on the plurality of quantized coefficients generated by the quantization unit 503 to restore a plurality of frequency coefficients. The inverse transforming unit 506 performs inverse frequency transform on the plurality of frequency coefficients restored by the inverse quantization unit 505 to restore a difference image. The adding unit 507 adds the prediction image to the difference image restored by the inverse transforming unit 506 to restore (reconstruct) an image. The adding unit 507 stores the restored image (the reconstructed image) in the block memory 508 and the picture memory 509.

The block memory 508 is a memory for storing images restored by the adding unit 507 on a block-by-block basis. The picture memory 509 is a memory for storing the images restored by the adding unit 507 on a picture-by-picture basis.

The intra predicting unit 510 performs intra prediction on an image (a picture) with reference to the block memory 508. In other words, the intra predicting unit 510 predicts each of the pixel values of pixels of the picture from another one of the pixel values of pixels of the current picture. In this way, the intra predicting unit 510 generates a prediction image. On the other hand, the inter predicting unit 511 performs inter prediction on an image (a picture) with reference to the picture memory 509. In other words, the inter predicting unit 511 predicts each of the pixel values of pixels of the picture from one of the pixel values of pixels of another picture. In this way, the inter predicting unit 511 generates a prediction image.

The selecting unit 512 selects any of the prediction image generated by the intra predicting unit 510 and the prediction image generated by the inter predicting unit 511, and outputs the selected prediction image to the subtracting unit 501 and the adding unit 507.

The image coding apparatus 500 may include a deblocking filter unit (not shown in FIG. 5). The deblocking filter unit may remove noise around block boundaries by performing deblocking filtering on the image restored by the adding unit 507. In addition, the image coding apparatus 500 may include a control unit which controls each of processes in the image coding apparatus 500.

Figure 6:
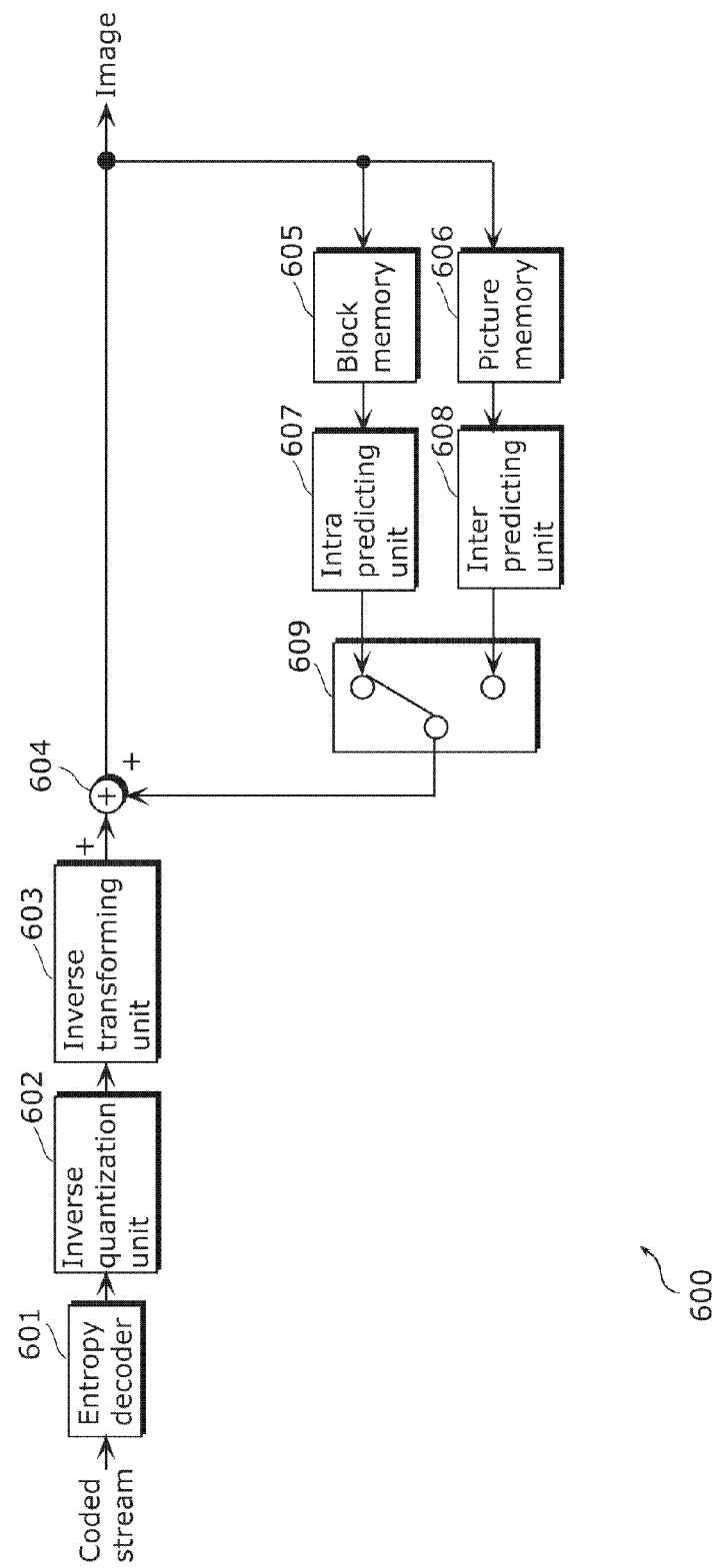
FIG. 6 is a block diagram of an image decoding apparatus according to Embodiment 1.

FIG. 6 is a block diagram of an image decoding apparatus 600 according to Embodiment 1. The image decoding apparatus 600 in FIG. 6 obtains the coded stream, and decodes each of the images on a block-by-block basis. More specifically, the image decoding apparatus 600 includes: an entropy decoder 601, an inverse quantization unit 602, an inverse transforming unit 603, an adding unit 604, a block memory 605, a picture memory 606, an intra predicting unit 607, an inter predicting unit 608, and a selecting unit 609.

The entropy decoder 601 decodes the plurality of quantized coefficients included in the coded stream. The inverse quantization unit 602 performs inverse quantization on the plurality of quantized coefficients decoded by the entropy decoder 601 to restore a plurality of frequency coefficients. The inverse transforming unit 603 performs inverse frequency transform on the plurality of frequency coefficients restored by the inverse quantization unit 602 to restore a difference image.

The adding unit 604 adds the prediction image to the difference image restored by the inverse transforming unit 603 to restore (reconstruct) an image. The adding unit 604 outputs the restored image (the reconstructed image). In addition, the adding unit 604 stores the restored image in the block memory 605 and the picture memory 606.

The block memory 605 is a memory for storing images restored by the adding unit 604 on a block-by-block basis. The picture memory 606 is a memory for storing the images restored by the adding unit 604 on a picture-by-picture basis.

The intra predicting unit 607 performs intra prediction on an image (a picture) with reference to the block memory 605. In other words, the intra predicting unit 607 predicts each of the pixel values of pixels of the picture from another one of the pixel values of pixels of the picture. In this way, the intra predicting unit 607 generates a prediction image. On the other hand, the inter predicting unit 608 performs inter prediction on an image (a picture) with reference to the picture memory 606. In other words, the inter predicting unit 608 predicts each of the pixel values of pixels of the picture from one of the pixel values of pixels of another picture. In this way, the inter predicting unit 608 generates a prediction image.

The selecting unit 609 selects any of the prediction image generated by the intra predicting unit 607 and the prediction image generated by the inter predicting unit 608, and outputs the selected prediction image to the adding unit 604.

The image decoding apparatus 600 may include a deblocking filter unit (not shown in FIG. 6). The deblocking filter unit may remove noise around block boundaries by performing deblocking filtering on the image restored by the adding unit 604. In addition, the image decoding apparatus 600 may include a control unit which controls each of processes in the image decoding apparatus 600.

The coding and decoding described above are performed for each of the coding units. The transform, quantization, inverse transform, and inverse quantization are performed for each of transform units (TU) included in each coding unit. The prediction is performed for each of the prediction units included in each coding unit.

Figure 7:
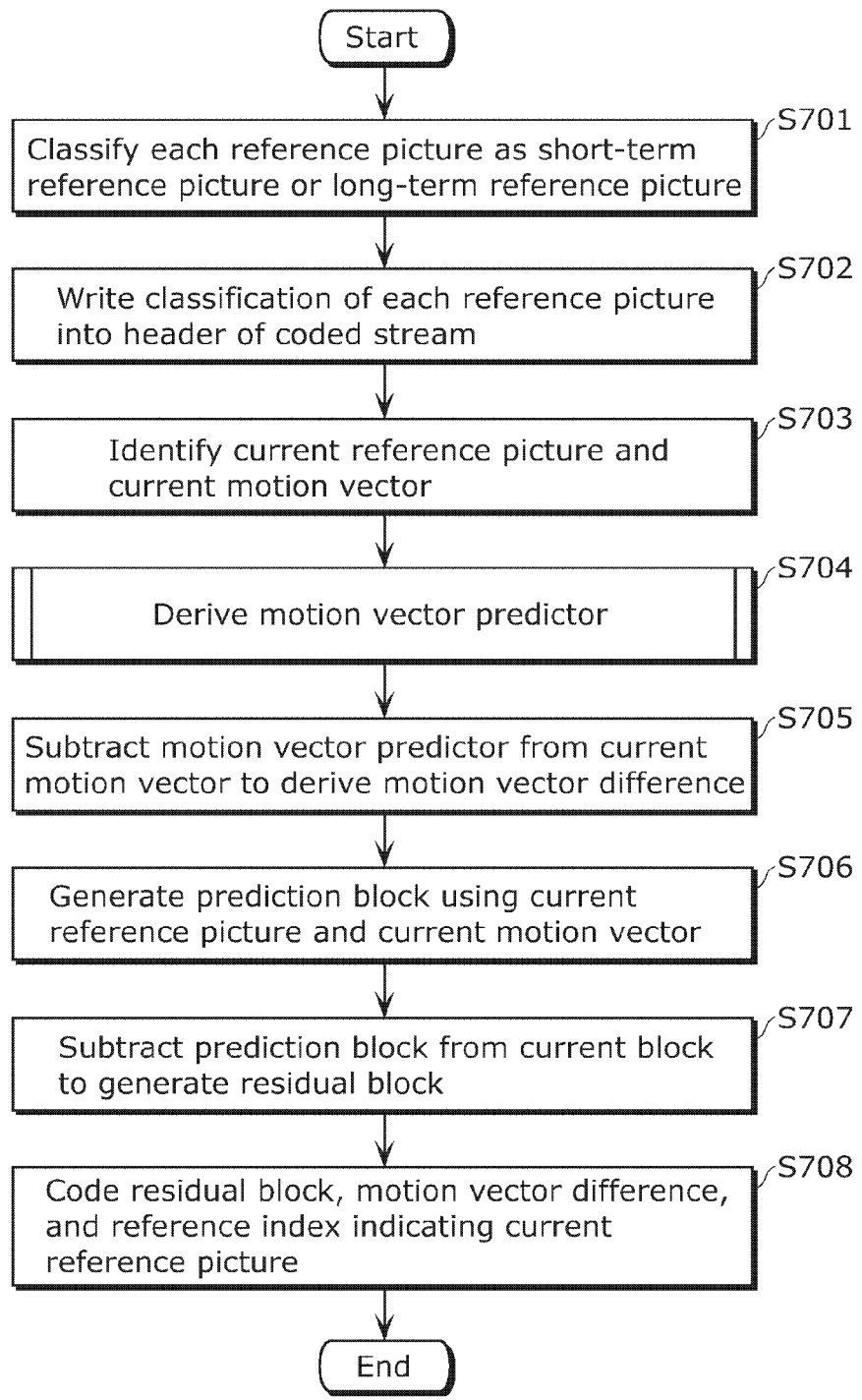
FIG. 7 is a flowchart of operations performed by the image coding apparatus according to Embodiment 1.

FIG. 7 is a flowchart of operations performed by the image coding apparatus 500 shown in FIG. 5. FIG. 7 specifically shows steps of coding an image using inter prediction.

First, the inter predicting unit 511 classifies each of reference pictures as a short-term reference picture or a long-term reference picture (S701).

The long-term reference picture is a reference picture which is suitable for use in a long period. In addition, the long-term reference picture is defined as a reference picture for use in a period longer than a period in which a short-term reference picture is used. For this reason, such a long-term reference picture is highly likely to be maintained for a long time in the picture memory 509. In addition, the long-term reference picture is specified according to an absolute POC that does not depend on a current picture. On the other hand, a short-term reference picture is specified according to a relative POC which is a temporal distance from a current picture.

Next, the entropy coder 504 writes information indicating the classification of each of the reference pictures in the header of the coded stream (S702). In other words, the entropy coder 504 writes the information indicating whether each of the reference pictures is a long-term reference picture or a short-term reference picture.

Next, the inter predicting unit 511 identifies a reference picture and a motion vector for a current block to be coded (a prediction target) (S703). Next, the inter predicting unit 511 derives a motion vector predictor (S704). The derivation steps of this derivation process are described in detail later.

Next, the inter predicting unit 511 subtracts the motion vector predictor from the current motion vector to derive the motion vector difference (S705). Next, the inter predicting unit 511 performs motion compensation using the current reference picture and the current motion vector to generate a prediction block (S706).

Next, the subtracting unit 501 subtracts the prediction block from the current block (the original image) to generate a residual block (S707). Lastly, the entropy coder 504 codes the residual block, the motion vector difference, and a reference index indicating the current reference picture to generate a coded stream including these data items (S708).

Figure 8:
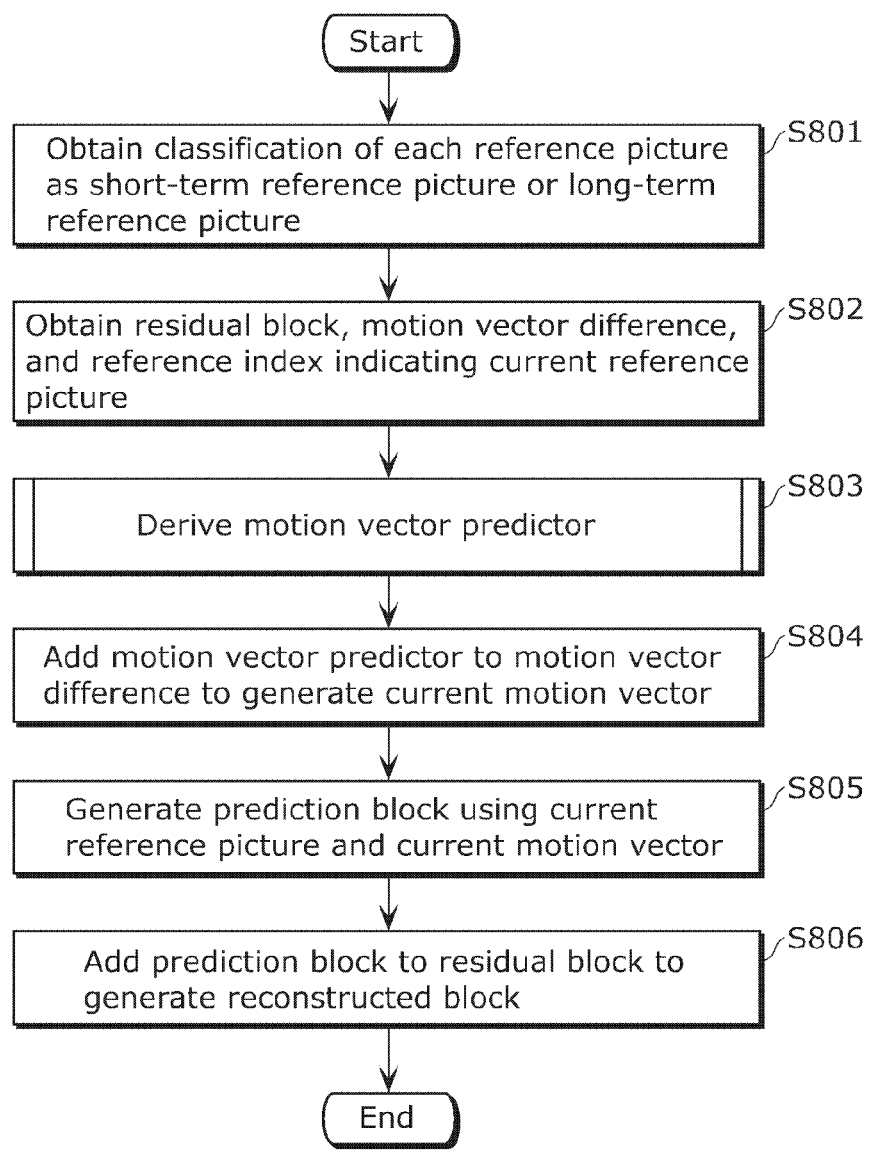
FIG. 8 is a flowchart of operations performed by the image decoding apparatus according to Embodiment 1.

FIG. 8 is a flowchart of operations performed by the image decoding apparatus 600 shown in FIG. 6. FIG. 8 specifically shows steps of decoding an image using inter prediction.

First, the entropy decoder 601 obtains the coded stream, and obtains information indicating the classification of each of the reference pictures by parsing the header of the coded stream (S801). In other words, the entropy decoder 601 writes the information indicating whether each of the reference pictures is a long-term reference picture or a short-term reference picture.

In addition, the entropy decoder 601 obtains the residual block, the motion vector difference, and the reference index indicating the current reference picture by parsing the coded stream (S802).

Next, the inter predicting unit 608 derives a motion vector predictor (S803). The derivation steps of this derivation process are described in detail later. Next, the inter predicting unit 608 adds the motion vector predictor to the motion vector difference to generate a current motion vector (S804). Next, the inter predicting unit 608 performs motion compensation using the current reference picture and the current motion vector to generate a prediction block (S805). Lastly, the adding unit 604 adds the prediction block to the residual block to generate a reconstructed block (S806).

Figure 9:
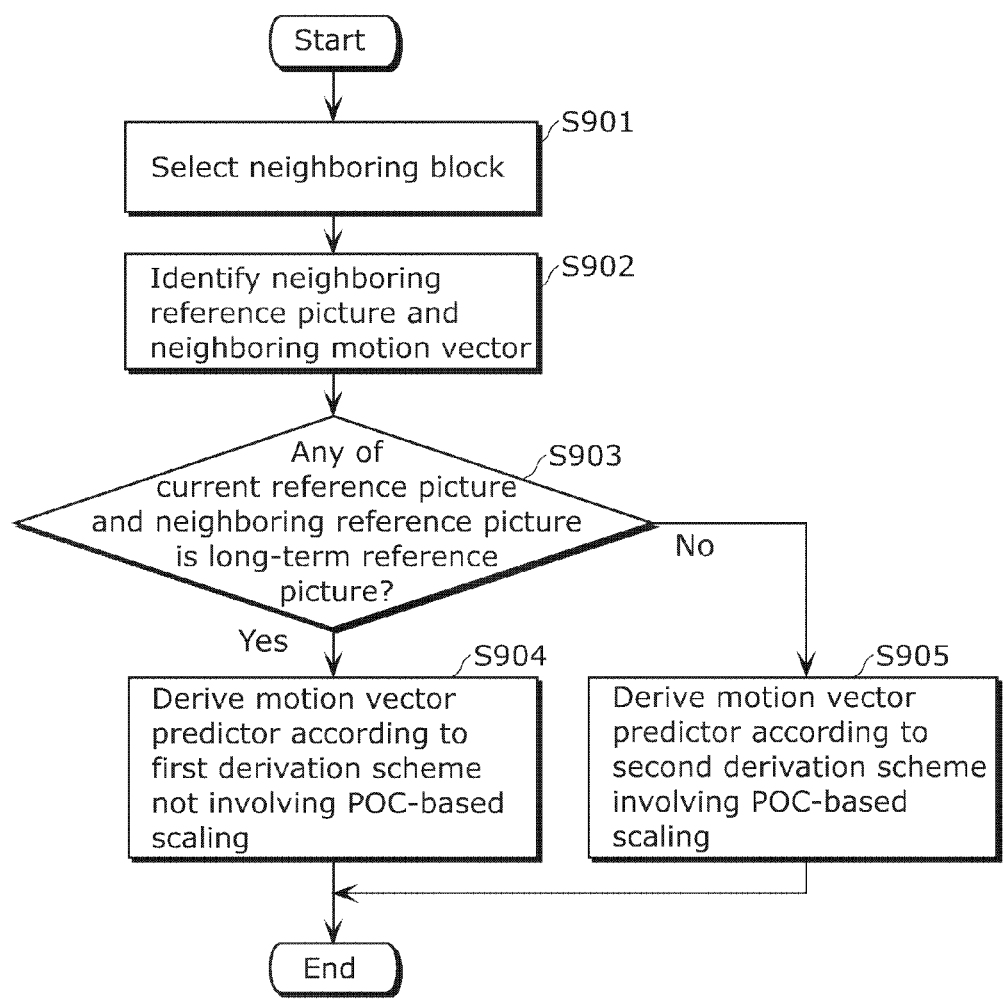
FIG. 9 is a flowchart of derivation steps of a derivation process according to Embodiment 1.

FIG. 9 is a flowchart of steps of a derivation process shown in FIG. 7 and FIG. 8. Operations by the inter predicting unit 511 in FIG. 5 are mainly described hereinafter. Operations performed by the inter predicting unit 608 are similar to operations performed by the inter predicting unit 511. Thus, "coding" may be replaced by "decoding" in the descriptions below.

First, the inter predicting unit 511 selects a neighboring block adjacent to a current block (S901). Next, the inter predicting unit 511 identifies a neighboring reference picture and a neighboring motion vector (S902).

Next, the inter predicting unit 511 determines whether or not any of the current reference picture and the neighboring reference picture is a long-term reference picture (S903). When the inter predicting unit 511 determines that any of the current reference picture and the neighboring reference picture is a long-term reference picture (Yes in S903), the inter predicting unit 511 derives a motion vector predictor according to a first derivation scheme (S904).

The first derivation scheme is a scheme using a neighboring motion vector. More specifically, the first derivation scheme is a scheme for directly deriving a neighboring motion vector as a motion vector predictor without POC-based scaling. The first derivation scheme may be a scheme for deriving a motion vector predictor by scaling a neighboring motion vector according to a predetermined constant ratio.

When the inter predicting unit 511 determines that each of the current reference picture and the neighboring reference picture is not a long-term reference picture (No in S903), the inter predicting unit 511 derives a motion vector predictor according to a second derivation scheme (S905). In other words, when the inter predicting unit 511 determines that both the current reference picture and the neighboring reference picture are short-term reference pictures, the inter predicting unit 511 derives a motion vector predictor according to the second derivation scheme.

The second derivation scheme is a scheme for using a current reference picture, a neighboring reference picture, and a neighboring motion vector. More specifically, the second derivation scheme is a scheme for deriving a motion vector predictor by performing POC-based scaling according to Expression 1 on a neighboring motion vector.

Referring to FIG. 9 again, a description is given of derivation steps of deriving a spatial motion vector predictor. The earlier-described derivation process may be modified as indicated below.

First, the inter predicting unit 511 sets a left motion vector predictor as being unavailable. Next, the inter predicting unit 511 tries to detect a block coded with reference to a current reference picture from blocks A0 and A1 in FIG. 4.

When the inter predicting unit 511 successfully detects such a block coded with reference to a current reference picture, the inter predicting unit 511 derives a motion vector for the block as the left motion vector predictor without scaling, and sets the left motion vector predictor as being available. When the inter predicting unit 511 does not successfully detect such a block coded with reference to a current reference picture, the inter predicting unit 511 tries to detect a block coded using inter prediction from the blocks A0 and A1 (S901).

When the inter predicting unit 511 successfully detects such an inter-prediction coded block, and detects that any of the reference picture for the block or the current reference picture is a long-term reference picture (S902 and Yes in S903), the inter predicting unit 511 derives the left motion vector predictor according to the first derivation scheme (S904). In other words, the inter predicting unit 511 derives the motion vector for the detected block as the left motion vector predictor without scaling. Next, the inter predicting unit 511 sets the left motion vector predictor as being available.

When the inter predicting unit 511 successfully detects such an inter-prediction coded block, and detects that each of the reference picture for the block or the current reference picture is not a long-term reference picture (S902 and No in S903), the inter predicting unit 511 derives the left motion vector predictor according to the second derivation scheme (S905). In other words, the inter predicting unit 511 performs POC-based scaling on the motion vector for the detected block to derive the left motion vector predictor. Next, the inter predicting unit 511 sets the left motion vector predictor as being available.

When the inter predicting unit 511 does not successfully detect such an inter-prediction coded block, the inter predicting unit 511 maintains the left motion vector predictor as being unavailable.

Next, the inter predicting unit 511 sets an upper motion vector predictor as being unavailable. Next, the inter predicting unit 511 tries to detect a block coded with reference to a current reference picture from blocks B0, B1, and B2 in FIG. 4.

When the inter predicting unit 511 successfully detects such a block coded with reference to a current reference picture, the inter predicting unit 511 derives a motion vector for the block as the upper motion vector predictor without scaling, and sets the upper motion vector predictor as being available. When the inter predicting unit 511 does not successfully detect such a block coded with reference to a current reference picture, the inter predicting unit 511 tries to detect a block coded using inter prediction from the blocks B0, B1, and B2 (S901).

When the inter predicting unit 511 successfully detects such an inter-prediction coded block, and detects that any of the reference picture for the block or the current reference picture is a long-term reference picture (S902 and Yes in S903), the inter predicting unit 511 derives the upper motion vector predictor according to the first derivation scheme (S904). In other words, the inter predicting unit 511 derives the motion vector for the detected block as the upper motion vector predictor without scaling. Next, the inter predicting unit 511 sets the upper motion vector predictor as being available.

When the inter predicting unit 511 successfully detects such an inter-prediction coded block, and detects that each of the reference picture for the block or the current reference picture is not a long-term reference picture (S902 and No in S903), the inter predicting unit 511 derives the upper motion vector predictor according to the second derivation scheme (S905). In other words, the inter predicting unit 511 performs POC-based scaling on the motion vector for the detected block to derive the upper motion vector predictor. Next, the inter predicting unit 511 sets the upper motion vector predictor as being available.

When the inter predicting unit 511 does not successfully detect such an inter-prediction coded block, the inter predicting unit 511 maintains the upper motion vector predictor as being unavailable.

As described above, each of the spatial motion vector predictors is set as being available or unavailable. The inter predicting unit 511 adds the spatial motion vector predictor set as being available to an ordered list of candidates for the motion vector predictors. The ordered list stores various kinds of motion vectors as candidates for the motion vector predictors, in addition to such spatial motion vector predictors.

The inter predicting unit 511 selects one of the motion vector predictors from the ordered list, and predicts a current motion vector using the selected motion vector predictor. At this time, the inter predicting unit 511 selects the motion vector predictor closest to the current motion vector or such a motion vector predictor that yields the highest efficiency in coding the current motion vector. An index corresponding to the selected motion vector predictor is written in the coded stream.

According to the above-described steps of the derivation process, it is possible to derive an appropriate spatial motion vector predictor from a neighboring motion vector without deriving any extremely large or small spatial motion vector predictor. This makes it possible to increase the prediction accuracy, and to thereby increase the coding efficiency.

It is to be noted that each of the reference pictures may be switched between a long-term reference picture and a short-term reference picture depending on time. For example, a short-term reference picture may be changed later into a long-term reference picture. On the other hand, a long-term reference picture may be changed later into a short-term reference picture.

In addition, the inter predicting unit 511 may determine whether a neighboring reference picture is a long-term reference picture or a short-term reference picture in a period in which a neighboring block is coded. Next, the image coding apparatus 500 may include an additional memory for storing the result of the determination between when the neighboring block is successfully coded and when the current block is successfully coded.

In this case, the inter predicting unit 511 determines whether the neighboring reference picture is a long-term reference picture or a short-term reference picture in a more precise manner.

Alternatively, the inter predicting unit 511 may determine whether a neighboring reference picture is a long-term reference picture or a short-term reference picture in a period in which a current block is coded.

In this case, there is no need to maintain, for a long time, the information indicating whether the neighboring reference picture is a long-term reference picture or a short-term reference picture.

Alternatively, the inter predicting unit 511 may determine whether a current reference picture is a long-term reference picture or a short-term reference picture, based on the temporal distance from the current reference picture to the current picture.

For example, when the temporal distance from the current reference picture to the current picture is larger than a predetermined threshold value, the inter predicting unit 511 may determine that the current reference picture is a long-term reference picture. On the other hand, when the temporal distance from the current reference picture to the current picture is smaller than or equal to the predetermined threshold value, the inter predicting unit 511 may determine that the current reference picture is a short-term reference picture.

Likewise, the inter predicting unit 511 may determine whether a neighboring reference picture is a long-term reference picture or a short-term reference picture, based on the temporal distance from the neighboring reference picture to the current picture.

For example, when the temporal distance from the neighboring reference picture to the current picture is larger than a predetermined threshold value, the inter predicting unit 511 may determine that the neighboring reference picture is a long-term reference picture. On the other hand, when the temporal distance from the current reference picture to the current picture is smaller than or equal to the predetermined threshold value, the inter predicting unit 511 may determine that the neighboring reference picture is a short-term reference picture.

Next, the inter predicting unit 608 of the image decoding apparatus 600 may determine whether each of the reference pictures is a long-term reference picture or a short-term reference picture based on a temporal distance, in a manner similar to the manner used by the image coding apparatus 500. In this case, there is no need to code the information indicating whether each of the reference pictures is a long-term reference picture or a short-term reference picture.

As for the other decoding processes, images coded with a high coding efficiency are appropriately decoded through processes performed by the structural elements of the image decoding apparatus 600 similar to the processes performed by the corresponding structural elements of the image coding apparatus 500.

The operations shown above are applicable to embodiments other than Embodiment 1. The structural elements and operations shown in Embodiment 1 may be incorporated into any of other embodiments, or the structural elements and operations shown in any of other embodiments may be incorporated into Embodiment 1.

Embodiment 2

An image coding apparatus and an image decoding apparatus are similar in structure to the image coding apparatus and the image decoding apparatus in Embodiment 1, respectively. For this reason, operations according to Embodiment 2 are described using the same structural elements as those of the image coding apparatus in FIG. 5 and the same structural elements as those of the image decoding apparatus in FIG. 6.

As in Embodiment 1, the image coding apparatus 500 according to Embodiment 2 performs operations as shown in FIG. 7. As in Embodiment 1, the image decoding apparatus 600 according to Embodiment 2 performs operations as shown in FIG. 8. Embodiment 2 is different from Embodiment 1 in the motion vector derivation process. The differences are described below in detail.

Figure 10:
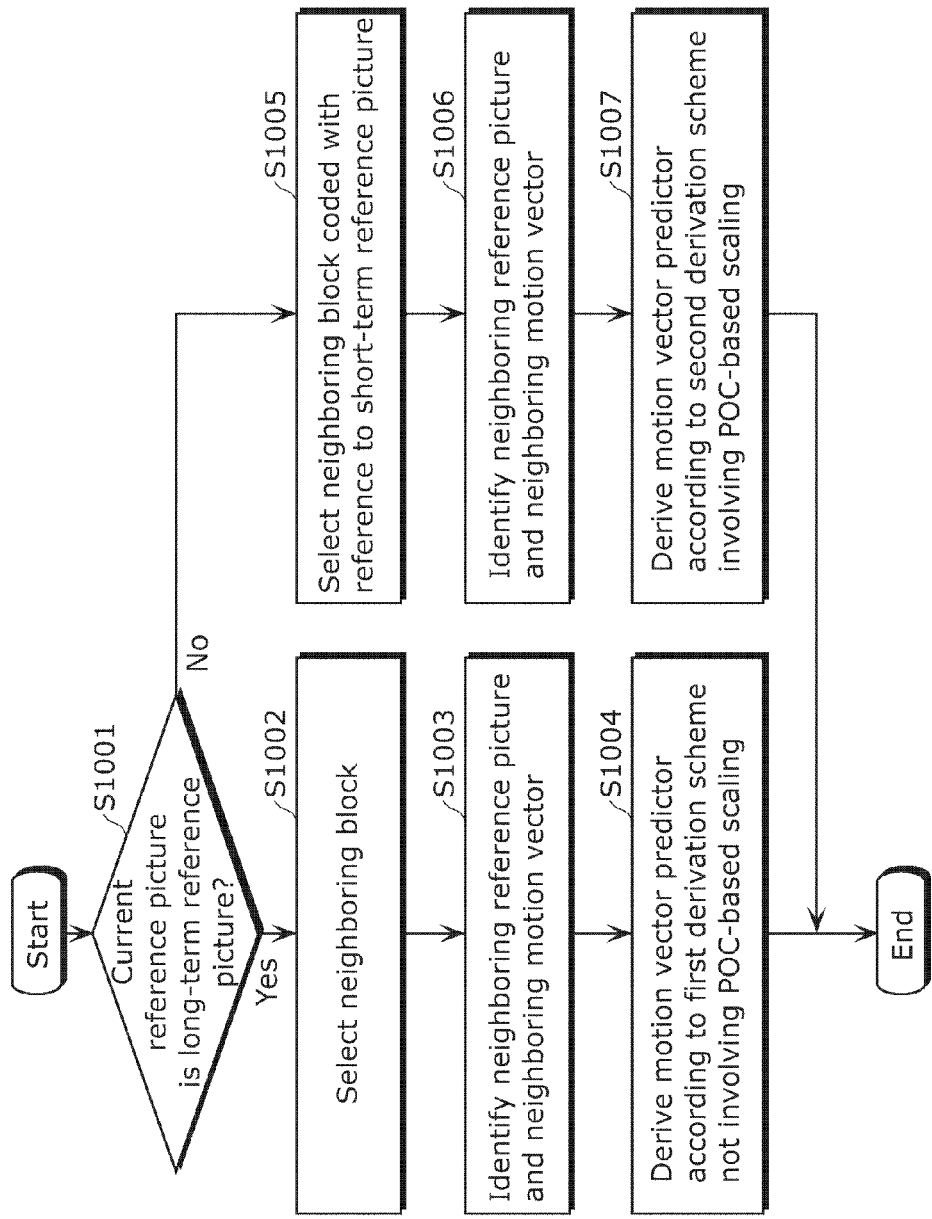
FIG. 10 is a flowchart of derivation steps of a derivation process according to Embodiment 2 of the present disclosure.

FIG. 10 is a flowchart of derivation steps of a derivation process according to Embodiment 2. An inter predicting unit 511 according to Embodiment 2 performs operations as shown in FIG. 10, instead of operations as shown in FIG. 9. Operations by the inter predicting unit 511 in FIG. 5 are mainly described hereinafter. Operations performed by the inter predicting unit 608 are similar to operations performed by the inter predicting unit 511. Thus, "coding" may be replaced by "decoding" in the descriptions below.

First, the inter predicting unit 511 determines whether or not a current reference picture is a long-term reference picture (S1001).

When the inter predicting unit 511 determines that the current reference picture is a long-term reference picture, the inter predicting unit 511 selects an inter-prediction coded neighboring block (S1002). Next, the inter predicting unit 511 identifies a neighboring reference picture and a neighboring motion vector (S1003). Next, the inter predicting unit 511 derives a motion vector predictor according to a first derivation scheme similar to the first derivation scheme in Embodiment 1 (S1004).

When the inter predicting unit 511 determines that the current reference picture is not a long-term reference picture (No in S1001), the inter predicting unit 511 selects a neighboring block coded with reference to a short-term reference picture (S1005).

In other words, when the inter predicting unit 511 determines that the current reference picture is a short-term reference picture, the inter predicting unit 511 selects the neighboring block coded with reference to the short-term reference picture. Next, the inter predicting unit 511 identifies the neighboring reference picture and the neighboring motion vector (S1006). Next, the inter predicting unit 511 derives a motion vector predictor according to a second derivation scheme similar to the second derivation scheme in Embodiment 1 (S1007).

As described above, when the reference picture for the current block is determined to be the short-term reference picture, the inter predicting unit 511 does not derive a motion vector predictor from the motion vector for the neighboring block coded with reference to a long-term reference picture.

In other words, when the inter predicting unit 511 determines that the reference picture for the current block is the short-term reference picture and that the reference picture for the neighboring block is the long-term reference picture, the inter predicting unit 511 does not derive any motion vector predictor from the motion vector for the neighboring block.

In this case, a motion vector predictor may be determined from a motion vector for another neighboring block coded with reference to a short-term reference picture, or no spatial motion vector predictor may be derived.

Referring to FIG. 10 again, a description is given of derivation steps of deriving a spatial motion vector predictor. The earlier-described derivation process may be modified as indicated below.

First, the inter predicting unit 511 sets a left motion vector predictor as being unavailable. Next, the inter predicting unit 511 tries to detect a block coded with reference to a current reference picture from blocks A0 and A1 in FIG. 4.

When the inter predicting unit 511 successfully detects such a block coded with reference to a current reference picture, the inter predicting unit 511 derives a motion vector for the block as the left motion vector predictor without scaling, and sets the left motion vector predictor as being available. When the inter predicting unit 511 does not successfully detect such a block coded with reference to a current reference picture, the inter predicting unit 511 checks whether or not the current reference picture is a long-term reference picture (S1001).

When the current reference picture is a long-term reference picture (Yes in S1001), the inter predicting unit 511 tries to detect a block coded using inter prediction (S1002) from the blocks A0 and A1.

When the inter predicting unit 511 successfully detects such an inter-prediction coded block, the inter predicting unit 511 derives a motion vector for the block as the left motion vector predictor without scaling, and sets the left motion vector predictor as being available (S1003 and S1004). When such an inter-prediction coded block is not detected, the inter predicting unit 511 maintains the left motion vector predictor as being unavailable.

When the current reference picture is a long-term reference picture (No in S1001), the inter predicting unit 511 tries to detect a block coded with reference to a short-term reference picture from the blocks A0 and A1 (S1005).

When the inter predicting unit 511 successfully detects such a block coded with reference to a current reference picture, the inter predicting unit 511 performs POC-based scaling on a motion vector for the block to derive a left motion vector predictor (S1006 and S1007). Next, the inter predicting unit 511 sets the left motion vector predictor as being available. When the inter predicting unit 511 does not successfully detect such a block coded with reference to a current reference picture, the inter predicting unit 511 maintains the left motion vector predictor as being unavailable.

Next, the inter predicting unit 511 sets an upper motion vector predictor as being unavailable. Next, the inter predicting unit 511 tries to detect a block coded with reference to a current reference picture from blocks B0, B1, and B2 in FIG. 4.

When the inter predicting unit 511 successfully detects such a block coded with reference to a current reference picture, the inter predicting unit 511 derives a motion vector for the block as the upper motion vector predictor without scaling, and sets the upper motion vector predictor as being available. When the inter predicting unit 511 does not successfully detect such a block coded with reference to a current reference picture, the inter predicting unit 511 checks whether or not the current reference picture is a long-term reference picture (S1001).

When the current reference picture is a long-term reference picture (Yes in S1001), the inter predicting unit 511 tries to detect a block coded using inter prediction (S1002) from the blocks B0, B1, and B2.

When the inter predicting unit 511 successfully detects such an inter-prediction coded block, the inter predicting unit 511 derives a motion vector for the block as the upper motion vector predictor without scaling, and sets the upper motion vector predictor as being available (S1003 and S1004). When the inter predicting unit 511 does not successfully detect such an inter-prediction coded block, the inter predicting unit 511 maintains the upper motion vector predictor as being unavailable.

When the current reference picture is not a long-term reference picture (No in S1001), the inter predicting unit 511 tries to detect a block coded with reference to a short-term reference picture from the blocks B0, B1, and B2 (S1005).

When the inter predicting unit 511 successfully detects such a block coded with reference to a short-term reference picture, the inter predicting unit 511 performs POC-based scaling on a motion vector for the block to derive an upper motion vector predictor (S1006 and S1007). Next, the inter predicting unit 511 sets the upper motion vector predictor as being available. When the inter predicting unit 511 does not successfully detect such a block coded with reference to a short-term reference picture, the inter predicting unit 511 maintains the upper motion vector predictor as being unavailable.

As described above, in Embodiment 2, when the reference picture for the current block is the short-term reference picture and the reference picture for the neighboring block is the long-term reference picture, no spatial motion vector predictor is derived from the motion vector for the neighboring block.

When any of the current reference picture and the neighboring reference picture is a long-term picture and the other is a short-term picture, it is very difficult to derive a spatial motion vector predictor with a high prediction accuracy. For this reason, the image coding apparatus 500 and the image decoding apparatus 600 according to Embodiment 2 perform the above-described processes to prevent that such a low prediction accuracy is yielded.

Embodiment 3

An image coding apparatus and an image decoding apparatus is similar in structure to the image coding apparatus and the image decoding apparatus in Embodiment 1, respectively. For this reason, operations according to Embodiment 3 are described using the same structural elements as those of the image coding apparatus in FIG. 5 and the same structural elements as those of the image decoding apparatus in FIG. 6.

As in Embodiment 1, the image coding apparatus 500 according to Embodiment 3 performs operations as shown in FIG. 7. As in Embodiment 1, the image decoding apparatus 600 according to Embodiment 3 performs operations as shown in FIG. 8. Embodiment 3 is different from Embodiment 1 in the motion vector derivation process. The differences are described below in detail.

Figure 11:
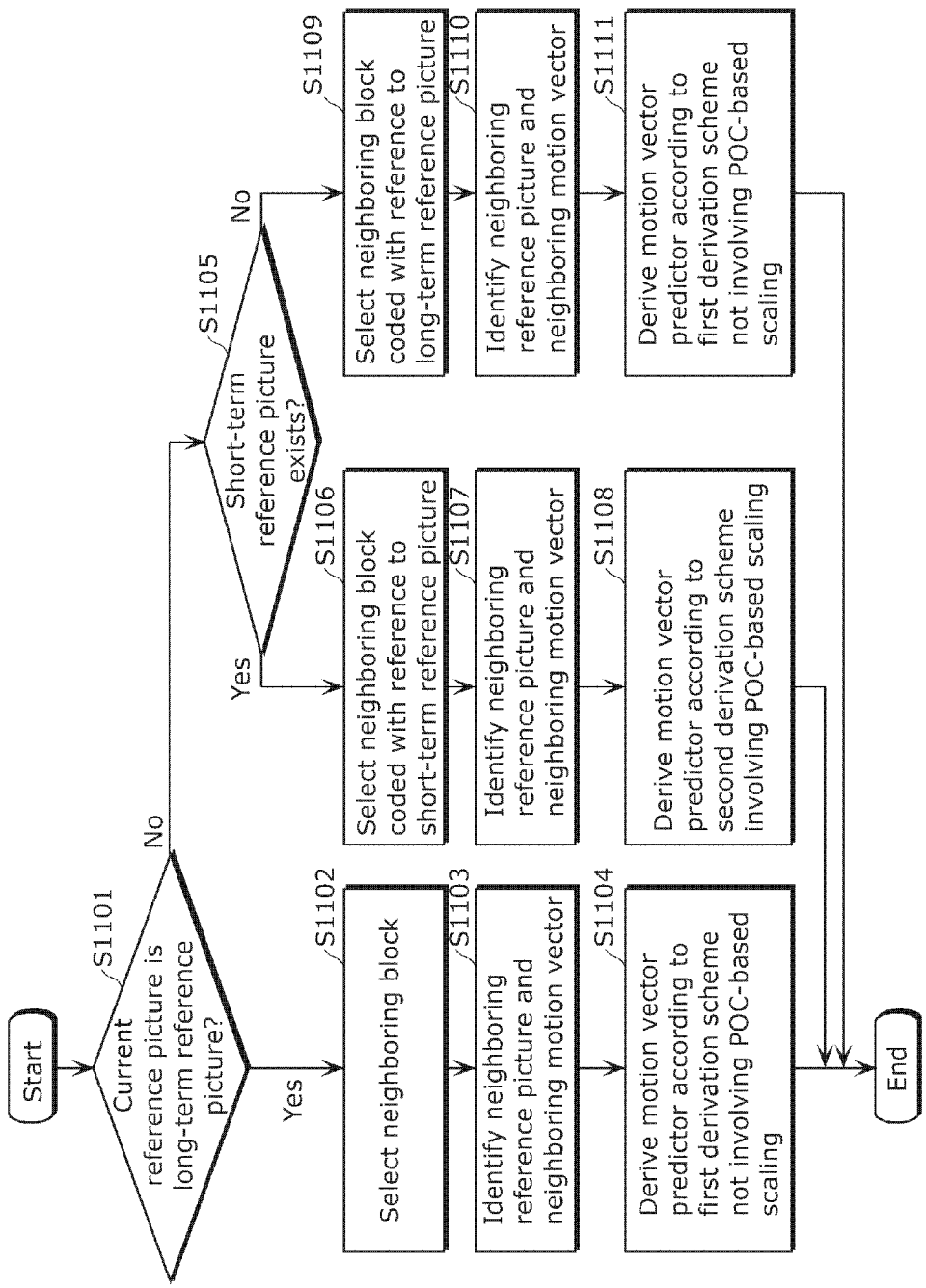
FIG. 11 is a flowchart of derivation steps of a derivation process according to Embodiment 3 of the present disclosure.

FIG. 11 is a flowchart of derivation steps of a derivation process according to Embodiment 3. An inter predicting unit 511 according to Embodiment 3 performs operations as shown in FIG. 11, instead of operations as shown in FIG. 9. Operations by the inter predicting unit 511 in FIG. 5 are mainly described hereinafter. Operations performed by the inter predicting unit 608 are similar to operations performed by the inter predicting unit 511. Thus, "coding" may be replaced by "decoding" in the descriptions below.

First, the inter predicting unit 511 determines whether or not a current reference picture is a long-term reference picture (S1101).

When the inter predicting unit 511 determines that the current reference picture is a long-term reference picture (Yes in S1101), the inter predicting unit 511 selects an inter-prediction coded neighboring block (S1102). Next, the inter predicting unit 511 identifies a neighboring reference picture and a neighboring motion vector (S1103). Next, the inter predicting unit 511 derives a motion vector predictor according to a first derivation scheme similar to the first derivation scheme in Embodiment 1 (S1104).

When the inter predicting unit 511 determines that the current reference picture is not a long-term reference picture (No in S1001), the inter predicting unit 511 determines whether or not a neighboring block coded with reference to a short-term reference picture exists (S1105).

When the inter predicting unit 511 determines that such a neighboring block coded with reference to a short-term reference picture exists (Yes in S1105), the inter predicting unit 511 selects the neighboring block (S1106). Next, the inter predicting unit 511 identifies the neighboring reference picture and the neighboring motion vector (S1107). Next, the inter predicting unit 511 derives a motion vector predictor according to a second derivation scheme similar to the second derivation scheme in Embodiment 1 (S1108).

When the inter predicting unit 511 determines that such a neighboring block coded with reference to a short-term reference picture does not exist (No in S1105), the inter predicting unit 511 selects an inter-prediction coded neighboring block. In other words, in this case, the inter predicting unit 511 selects the neighboring block coded with reference to a long-term reference picture (S1109).

Next, the inter predicting unit 511 identifies the neighboring reference picture and the neighboring motion vector (S1110). Next, the inter predicting unit 511 derives a motion vector predictor according to a first derivation scheme similar to the first derivation scheme in Embodiment 1 (S1111).

In other words, when the reference picture for the current block is a short-term reference picture, the neighboring block coded with reference to a short-term reference picture is selected preferentially over the neighboring block coded with reference to a long-term reference picture. Next, a motion vector predictor is derived from the selected neighboring block according to the first derivation scheme or the second derivation scheme.

Referring to FIG. 11 again, a description is given of derivation steps of deriving a spatial motion vector predictor. The earlier-described derivation process may be modified as indicated below.

First, the inter predicting unit 511 sets a left motion vector predictor as being unavailable. Next, the inter predicting unit 511 tries to detect a block coded with reference to a current reference picture from blocks A0 and A1 in FIG. 4.

When the inter predicting unit 511 successfully detects such a block coded with reference to a current reference picture, the inter predicting unit 511 derives a motion vector for the block as the left motion vector predictor without scaling, and sets the left motion vector predictor as being available. When the inter predicting unit 511 does not successfully detect such a block coded with reference to a current reference picture, the inter predicting unit 511 checks whether or not the current reference picture is a long-term reference picture (S1101).

When the inter predicting unit 511 determines that the current reference picture is a long-term reference picture (Yes in S1101), the inter predicting unit 511 tries to detect an inter-prediction coded block (S1102) from the blocks A0 and A1.

When the inter predicting unit 511 successfully detects such an inter-prediction coded block, the inter predicting unit 511 derives a motion vector for the block as the left motion vector predictor without scaling, and sets the left motion vector predictor as being available (S1103 and S1104). When the inter predicting unit 511 does not successfully detect such an inter-prediction coded block, the inter predicting unit 511 maintains the left motion vector predictor as being unavailable.

When the inter predicting unit 511 determines that the current reference picture is not a long-term reference picture (No in S1101), the inter predicting unit 511 tries to detect a block coded with reference to a short-term reference picture from the blocks A0 and A1.

When the inter predicting unit 511 successfully detects such a block coded with reference to a short-term reference picture (Yes in S1105), the inter predicting unit 511 derives a left motion vector predictor from the block (S1106, S1007, and S1008). At this time, the inter predicting unit 511 performs POC-based scaling on the motion vector for the block to derive the left motion vector predictor. Next, the inter predicting unit 511 sets the left motion vector predictor as being available.

When the inter predicting unit 511 does not successfully detect such a block coded with reference to a short-term reference picture (No in S1105), the inter predicting unit 511 tries to detect a block coded using inter prediction from the blocks A0 and A1. In other words, the inter predicting unit 511 tries to detect the block coded with reference to the long-term reference picture from the blocks A0 and A1.

When the inter predicting unit 511 successfully detects such an inter-prediction coded block, the inter predicting unit 511 derives a motion vector for the block as the left motion vector predictor without scaling, and sets the left motion vector predictor as being available (S1109, S1110, and S1111). When the inter predicting unit 511 does not successfully detect such an inter-prediction coded block, the inter predicting unit 511 maintains the left motion vector predictor as being unavailable.

Next, the inter predicting unit 511 sets an upper motion vector predictor as being unavailable. Next, the inter predicting unit 511 tries to detect a block coded with reference to a current reference picture from blocks B0, B1, and B2 in FIG. 4.

When the inter predicting unit 511 successfully detects such a block coded with reference to a current reference picture, the inter predicting unit 511 derives a motion vector for the block as the upper motion vector predictor without scaling, and sets the upper motion vector predictor as being available. When the inter predicting unit 511 does not successfully detect such a block coded with reference to a current reference picture, the inter predicting unit 511 checks whether or not the current reference picture is a long-term reference picture (S1101).

When the inter predicting unit 511 determines that the current reference picture is a long-term reference picture (Yes in S1101), the inter predicting unit 511 tries to detect a block coded using inter prediction from the blocks B0, B1, and B2 (S1102).

When the inter predicting unit 511 successfully detects such an inter-prediction coded block, the inter predicting unit 511 derives a motion vector for the block as the upper motion vector predictor without scaling, and sets the upper motion vector predictor as being available (S1103 and S1104). When the inter predicting unit 511 does not successfully detect such an inter-prediction coded block, the inter predicting unit 511 maintains the upper motion vector predictor as being unavailable.

When the inter predicting unit 511 determines that the current reference picture is not a long-term reference picture (No in S1101), the inter predicting unit 511 tries to detect a block coded with reference to a short-term reference picture from the blocks B0, B1, and B2.

When the inter predicting unit 511 successfully detects such a block coded with reference to a short-term reference picture (Yes in S1105), the inter predicting unit 511 derives an upper motion vector predictor from the block (S1106, S1007, and S1008). At this time, the inter predicting unit 511 performs POC-based scaling on the motion vector for the block to derive the upper motion vector predictor. Next, the inter predicting unit 511 sets the upper motion vector predictor as being available.

When the inter predicting unit 511 does not successfully detect such a block coded with reference to a short-term reference picture (No in S1105), the inter predicting unit 511 tries to detect an inter-prediction coded block from the blocks B0, B1, and B2. In other words, the inter predicting unit 511 tries to detect the block coded with reference to a long-term reference picture from the blocks B0, B1, and B2.

When the inter predicting unit 511 successfully detects such an inter-prediction coded block, the inter predicting unit 511 derives a motion vector for the block as the upper motion vector predictor without scaling, and sets the upper motion vector predictor as being available (S1109, S1110, and S1111). When the inter predicting unit 511 does not successfully detect such an inter-prediction coded block, the inter predicting unit 511 maintains the upper motion vector predictor as being unavailable.

As described above, when the reference picture for the current block is a short-term reference picture, the neighboring block coded with reference to a short-term reference picture is selected preferentially over the neighboring block coded with reference to a long-term reference picture.

When both the current reference picture and the neighboring reference picture are short-term pictures, increase in the accuracy of predicting a spatial motion vector predictor is expected. For this reason, the image coding apparatus 500 and the image decoding apparatus 600 according to Embodiment 3 achieve such a high prediction accuracy by performing the above-described operations.

Embodiment 4

Embodiment 4 is provided to confirm the unique structural elements and unique processing procedures in Embodiments 1 to 3.

Figure 12A:
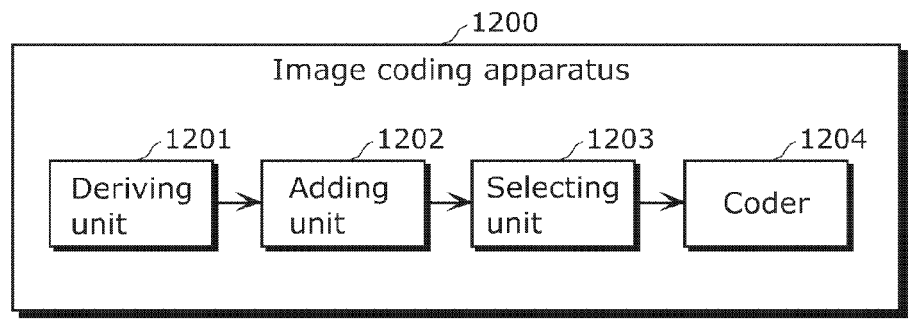
FIG. 12A is a block diagram of an image coding apparatus according to Embodiment 4 of the present disclosure.

FIG. 12A is a block diagram of an image coding apparatus 1200 according to Embodiment 4. The image coding apparatus 1200 in FIG. 12A codes each of the blocks of pictures. The image coding apparatus 1200 includes a deriving unit 1201, an adding unit 1202, a selecting unit 1203, and a coder 1204.

For example, the deriving unit 1201, the adding unit 1202, and the selecting unit 1203 as a set correspond to, for example, the inter predicting unit 511 shown in FIG. 5. The coder 1204 corresponds to, for example, the entropy coder 504 in FIG. 5.

Figure 12B:
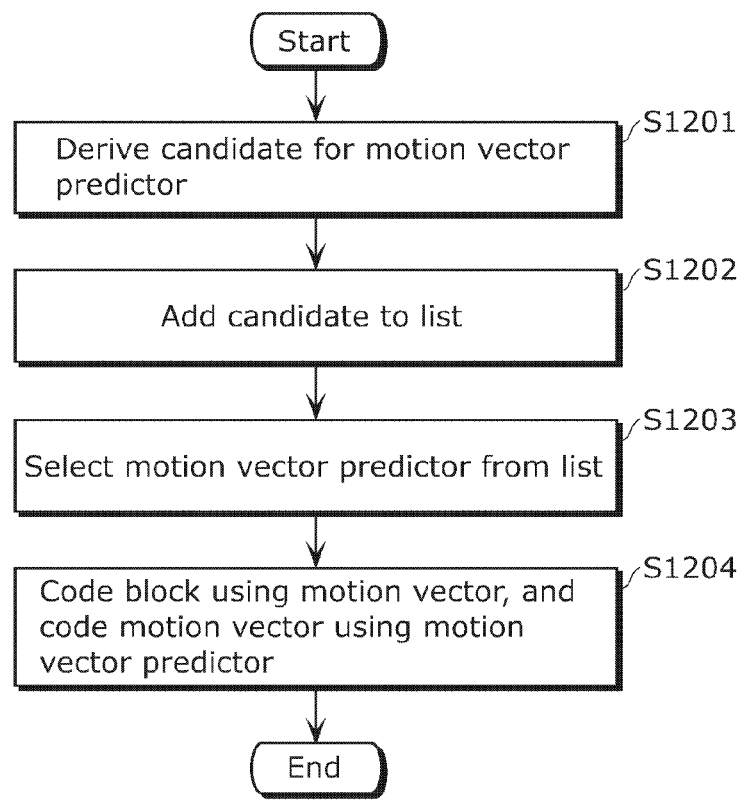
FIG. 12B is a flowchart of operations performed by the image coding apparatus according to Embodiment 4.

FIG. 12B is a flowchart of operations performed by the image coding apparatus 1200 shown in FIG. 12A.

The deriving unit 1201 derives a candidate for a motion vector predictor from a motion vector for a neighboring block (S1201). The neighboring block is a block included in a current picture including a current block to be coded and is adjacent to the current block. The motion vector predictor is used in the coding of the motion vector for the current block.

In the derivation of the candidate, the deriving unit 1201 determines whether a reference picture for the current block is a long-term reference picture or a short-term reference picture. In addition, the deriving unit 1201 determines whether a reference picture for the neighboring block is a long-term reference picture or a short-term reference picture.

Here, when the deriving unit 1201 determines that both the reference picture for the current block and the reference picture for the neighboring block are long-term reference pictures, the deriving unit 1201 derives the candidate from the motion vector for the neighboring block according to a first derivation scheme. The first derivation scheme is a derivation scheme which does not involve scaling based on a temporal distance.

On the other hand, when the deriving unit 1201 determines that both the reference picture for the current block and the reference picture for the neighboring block are short-term reference pictures, the deriving unit 1201 derives the candidate from the motion vector for the neighboring block according to a second derivation scheme. The second derivation scheme is a derivation scheme which involves scaling based on a temporal distance.

The adding unit 1202 adds the derived candidate to a list (S1202). The selecting unit 1203 selects a motion vector predictor from the list including the added candidate (S1203).

The coder 1204 codes the current block using the motion vector for the current block and the reference picture for the current block. In addition, the coder 1204 codes the motion vector for the current block using the selected motion vector predictor (S1204).

Figure 13A:
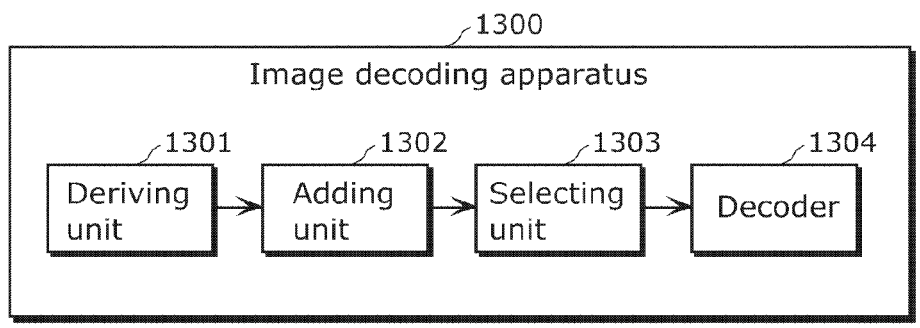
FIG. 13A is a block diagram of the image decoding apparatus according to Embodiment 4.

FIG. 13A is a block diagram of an image decoding apparatus 1300 according to Embodiment 4. The image decoding apparatus 1300 in FIG. 13A decodes each of the blocks of pictures. The image decoding apparatus 1300 includes a deriving unit 1301, an adding unit 1302, a selecting unit 1303, and a decoder 1304.

For example, the deriving unit 1301, the adding unit 1302, and the selecting unit 1303 as a set correspond to, for example, the inter predicting unit 608 shown in FIG. 6. The decoder 1304 corresponds to, for example, the entropy decoding unit 601 in FIG. 6.

Figure 13B:
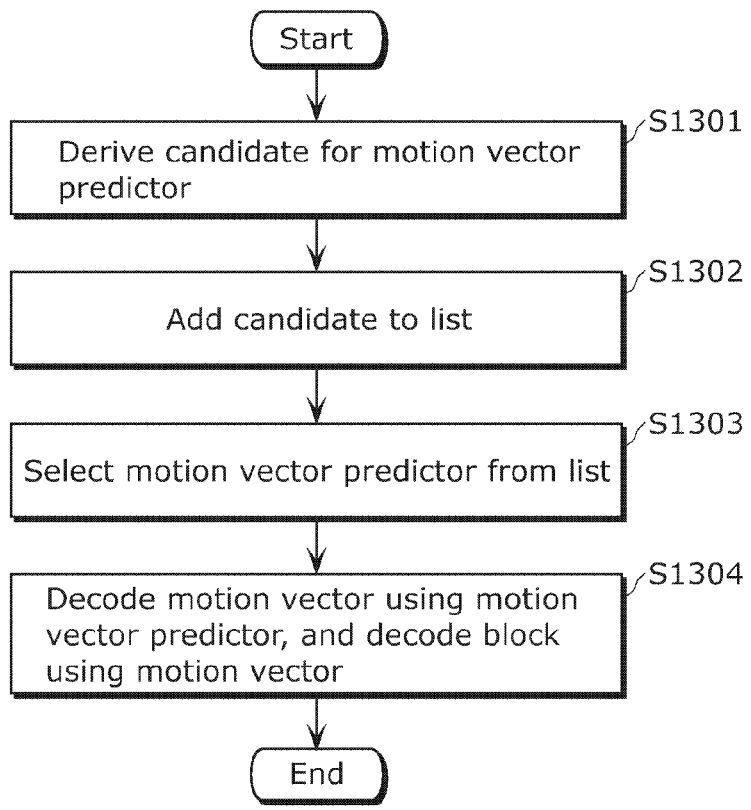
FIG. 13B is a flowchart of operations performed by the image decoding apparatus according to Embodiment 4.

FIG. 13B is a flowchart of operations performed by the image decoding apparatus 1300 shown in FIG. 13A.

The deriving unit 1301 derives a candidate for a motion vector predictor from a motion vector for a neighboring block (S1301). The neighboring block is a block included in a current picture including a current block to be decoded and is adjacent to the current block. The motion vector predictor is used in the decoding of the motion vector for the current block.

In the derivation of the candidate, the deriving unit 1301 determines whether a reference picture for the current block is a long-term reference picture or a short-term reference picture. In addition, the deriving unit 1301 determines whether a reference picture for the neighboring block is a long-term reference picture or a short-term reference picture.

Here, when the deriving unit 1301 determines that both the reference picture for the current block and the reference picture for the neighboring block are long-term reference pictures, the deriving unit 1301 derives the candidate from the motion vector for the neighboring block according to a first derivation scheme. The first derivation scheme is a derivation scheme which does not involve scaling based on a temporal distance.

On the other hand, when the deriving unit 1301 determines that both the reference picture for the current block and the reference picture for the neighboring block are short-term reference pictures, the deriving unit 1301 derives the candidate from the motion vector for the neighboring block according to a second derivation scheme. The second derivation scheme is a derivation scheme which involves scaling based on a temporal distance.

The adding unit 1302 adds the derived candidate to a list (S1302). The selecting unit 1303 selects a motion vector predictor from the list including the added candidate (S1303).

In addition, the decoder 1304 decodes the motion vector for the current block using the selected motion vector predictor. In addition, the decoder 1304 decodes the current block using the motion vector for the current block and the reference picture for the current block (S1304).

According to the above-described steps of the derivation process, it is possible to derive an appropriate motion vector predictor from a motion vector for a neighboring block without deriving any extremely large or small motion vector predictor. This makes it possible to increase the prediction accuracy, and to thereby increase the coding efficiency.

It is to be noted that each of the deriving unit 1201 and the deriving unit 1301 does not need to derive a candidate from the motion vector for the neighboring block when determining that one of the reference picture for the current block and the reference picture for the neighboring block is a long-term reference picture and the other is a short-term picture.

In this case, each of the deriving unit 1201 and the deriving unit 1301 may further select another neighboring block coded or decoded with reference to a short-term reference picture, and may derive a candidate from the other neighboring block according to the second derivation scheme. Alternatively, in this case, each of the deriving unit 1201 and the deriving unit 1301 may derive a candidate according to another derivation scheme. Alternatively, in this case, each of the deriving unit 1201 and the deriving unit 1301 does not always need to finally derive a candidate corresponding to a spatial motion vector.

In addition, each of the deriving unit 1201 and the deriving unit 1301 may determine whether the reference picture for the current block is a long-term reference picture or a short-term reference picture, based on the temporal distance from the reference picture for the current block and the current picture.

Alternatively, each of the deriving unit 1201 and the deriving unit 1301 may determine whether the reference picture for the neighboring block is a long-term reference picture or a short-term reference picture, based on the temporal distance from the reference picture for the neighboring block and the current picture.

Alternatively, each of the deriving unit 1201 and the deriving unit 1301 may determine whether the reference picture for the neighboring block is a long-term reference picture or a short-term reference picture, in a period in which the neighboring block is coded or decoded.

Alternatively, each of the deriving unit 1201 and the deriving unit 1301 may determine whether the reference picture for the neighboring block is a long-term reference picture or a short-term reference picture, in a period in which the current block is coded or decoded.

The first derivation scheme may be a scheme for deriving a motion vector for a neighboring block as a candidate. The second derivation scheme may be a scheme for deriving a candidate, based on the ratio of the temporal distance from the reference picture for the neighboring block to the current picture with respect to the temporal distance from the reference picture for the current block to the current picture.

In addition, the coder 1204 may further code (i) information indicating whether the reference picture for the current block is a long-term reference picture or a short-term reference picture, and (ii) information indicating whether the reference picture for the neighboring block is a long-term reference picture or a short-term reference picture.

The decoder 1304 may further decode (i) information indicating whether the reference picture for the current block is a long-term reference picture or a short-term reference picture, and (ii) information indicating whether the reference picture for the neighboring block is a long-term reference picture or a short-term reference picture.

Furthermore, the deriving unit 1301 may determine, using the decoded information, whether the reference picture for the current block is a long-term reference picture or a short-term reference picture. Furthermore, the deriving unit 1301 may determine, using the decoded information, whether the reference picture for the neighboring block is a long-term reference picture or a short-term reference picture.

Information indicating the classification of the reference picture may be stored as a parameter at a position in a coded stream as indicated below.

Figure 14A:
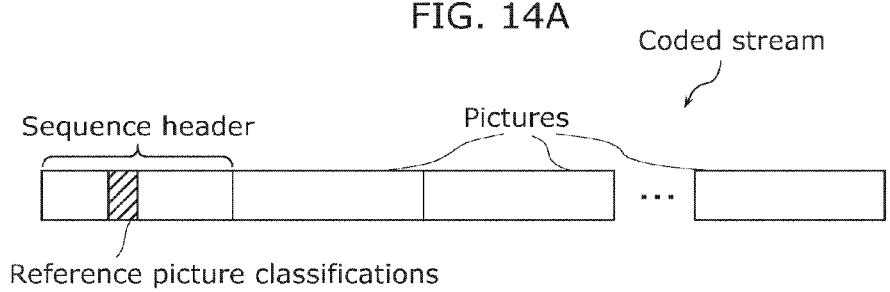
FIG. 14A is a first example of storage positions of parameters indicating classifications of reference pictures.

FIG. 14A is a first example of storage positions of parameters indicating classifications of reference pictures. As shown in FIG. 14A, these parameters indicating the classifications of the reference pictures may be stored in a sequence header. The sequence header is also referred to as a sequence parameter set.

Figure 14B:
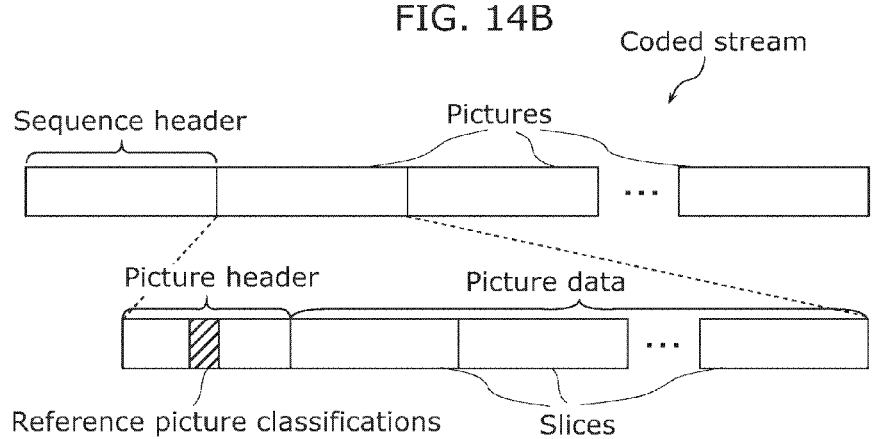
FIG. 14B is a second example of storage positions of parameters indicating classifications of reference pictures.

FIG. 14B is a second example of storage positions of parameters indicating classifications of reference pictures. As shown in FIG. 14B, these parameters indicating the classifications of the reference pictures may be stored in a picture header. The picture header is also referred to as a picture parameter set.

Figure 14C:
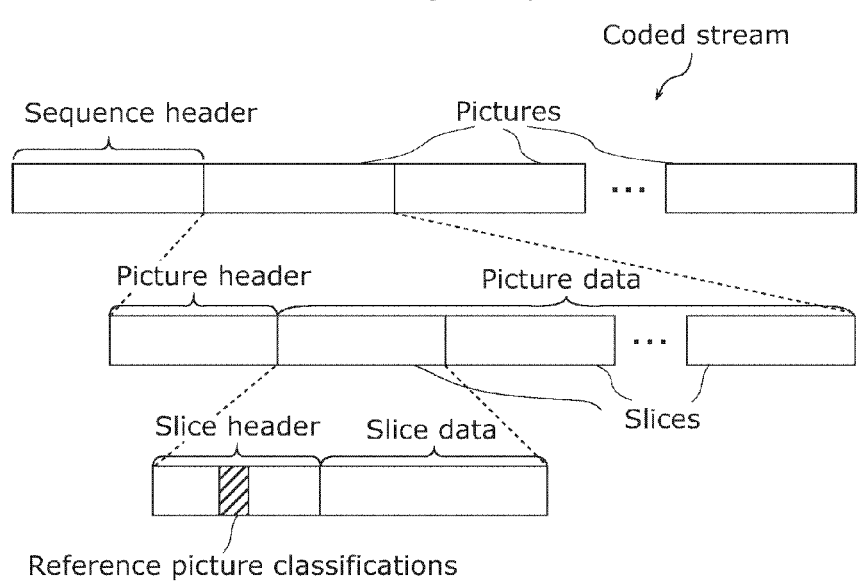
FIG. 14C is a third example of storage positions of parameters indicating classifications of reference pictures.

FIG. 14C is a third example of storage positions of parameters indicating classifications of reference pictures. As shown in FIG. 14C, these parameters indicating the classifications of the reference pictures may be stored in a slice header.

Furthermore, information indicating a prediction mode (inter prediction or intra prediction) may be stored at a position in a coded stream as indicated below.

Figure 15:
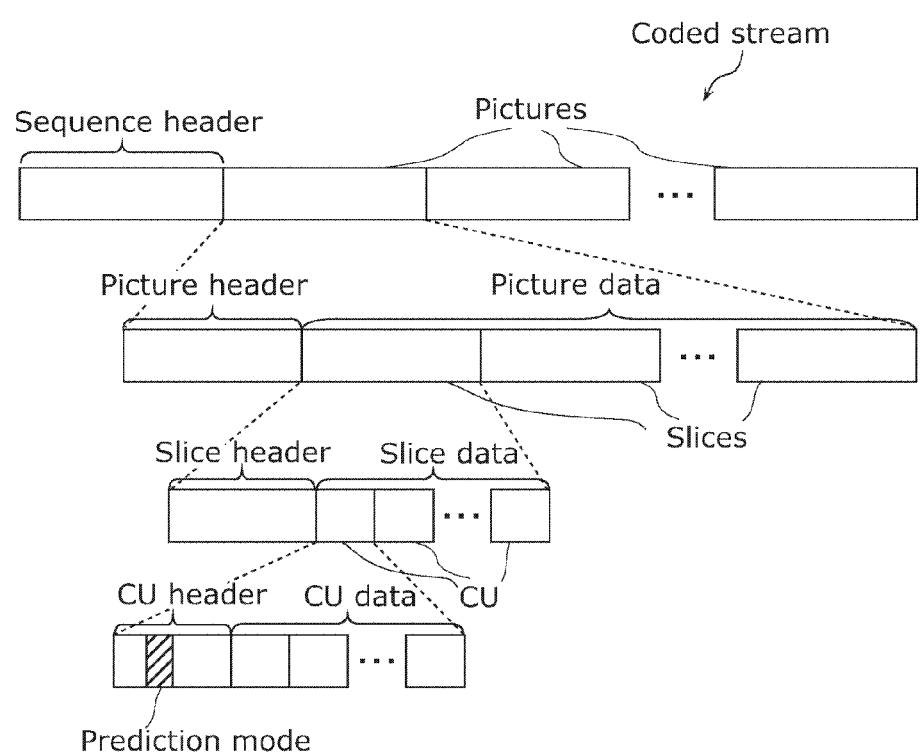
FIG. 15 is an illustration of an example of a storage position of a parameter indicating a prediction mode.

FIG. 15 is an illustration of an example of a storage position of such a parameter indicating a prediction mode. As shown in FIG. 15, this parameter may be stored in a coding unit (CU) header. This parameter indicates whether prediction units in the coding unit have been coded using inter prediction or intra prediction. This parameter may be used in the determination on whether the neighboring block is available or not.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the image coding apparatus according to each of the embodiments is a program described below.

More specifically, this program is a program for causing a computer to execute an image coding method of coding each of blocks of pictures, according to an aspect of the present disclosure. The image coding method includes: deriving a candidate for a motion vector predictor to be used in coding of a motion vector for a current block to be coded, from a motion vector for a neighboring block which is included in a current picture including the current block and is adjacent to the current block; adding the derived candidate to a list; selecting the motion vector predictor from the list including the added candidate; and coding the current block using the motion vector for the current block and a reference picture for the current block, and coding the motion vector for the current block using the selected motion vector predictor; wherein, in the deriving: whether the reference picture for the current block is a long-term reference picture or a short-term reference picture is determined, and whether a reference picture for the neighboring block is a long-term reference picture or a short-term reference picture is determined; and when each of the reference picture for the current block and the reference picture for the neighboring block is determined to be a long-term reference picture, the candidate is derived from the motion vector for the neighboring block according to a first derivation scheme which does not involve scaling based on a temporal distance, and when each of the reference picture for the current block and the reference picture for the neighboring block is determined to be a short-term reference picture, the candidate is derived from the motion vector for the neighboring block according to a second derivation scheme which involves scaling based on a temporal distance.

More specifically, this program is a program for causing a computer to execute an image decoding method of decoding each of blocks of pictures, according to an aspect of the present disclosure. The image decoding method includes: deriving a candidate for a motion vector predictor to be used in decoding of a motion vector for a current block to be decoded, from a motion vector for a neighboring block which is included in a current picture including the current block and is adjacent to the current block; adding the derived candidate to a list; selecting the motion vector predictor from the list including the added candidate; and decoding the motion vector for the current block using the selected motion vector predictor, and decoding the current block using the motion vector for the current block and a reference picture for the current block, wherein, in the deriving: whether the reference picture for the current block is a long-term reference picture or a short-term reference picture is determined, and whether the reference picture for the neighboring block is a long-term reference picture or a short-term reference picture is determined; and when each of the reference picture for the current block and the reference picture for the neighboring block is determined to be a long-term reference picture, the candidate is derived from the motion vector for the neighboring block according to a first derivation scheme which does not involve scaling based on a temporal distance, and when each of the reference picture for the current block and the reference picture for the neighboring block is determined to be a short-term reference picture, the candidate is derived from the motion vector for the neighboring block according to a second derivation scheme which involves scaling based on a temporal distance.

Alternatively, these structural elements may be integrated into a single circuit, or may be separate circuits. Alternatively, these structural elements may be implemented as a general or exclusive processor or as general or exclusive processors.

The image coding apparatuses according to one or more embodiments have been described above, but the scope of the Claims is not limited to these embodiments. Those skilled in the art will readily appreciate that various modifications may be made in these exemplary embodiments and variations may be obtained by arbitrarily combining structural elements of different embodiments, without materially departing from the principles and spirit of the inventive concept, the scope of which is defined in the appended Claims and their equivalents. Accordingly, all such modifications and variations may be substantially included in the one or more embodiments disclosed herein.

For example, the image coding and decoding apparatus according to one embodiment may include an image coding apparatus and an image decoding apparatus each according to one of the embodiments. In addition, one process executed by a particular processing unit may be executed by another processing unit. In addition, the execution order of processes may be changed, or some of the processes may be executed in parallel to each other.

Embodiment 5

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 16:
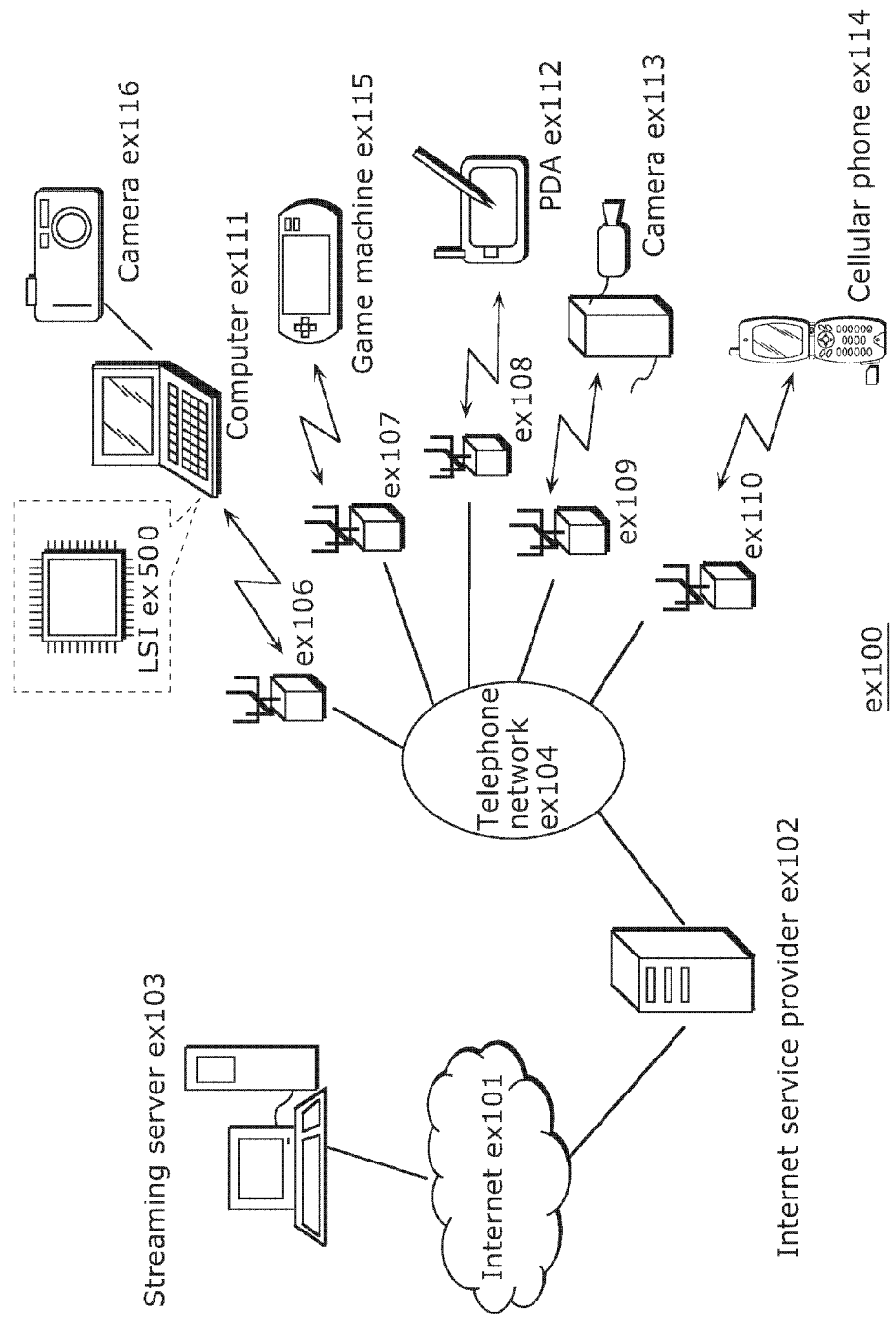
FIG. 16 shows an overall configuration of a content providing system for implementing content distribution services.

FIG. 16 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 16, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 17:
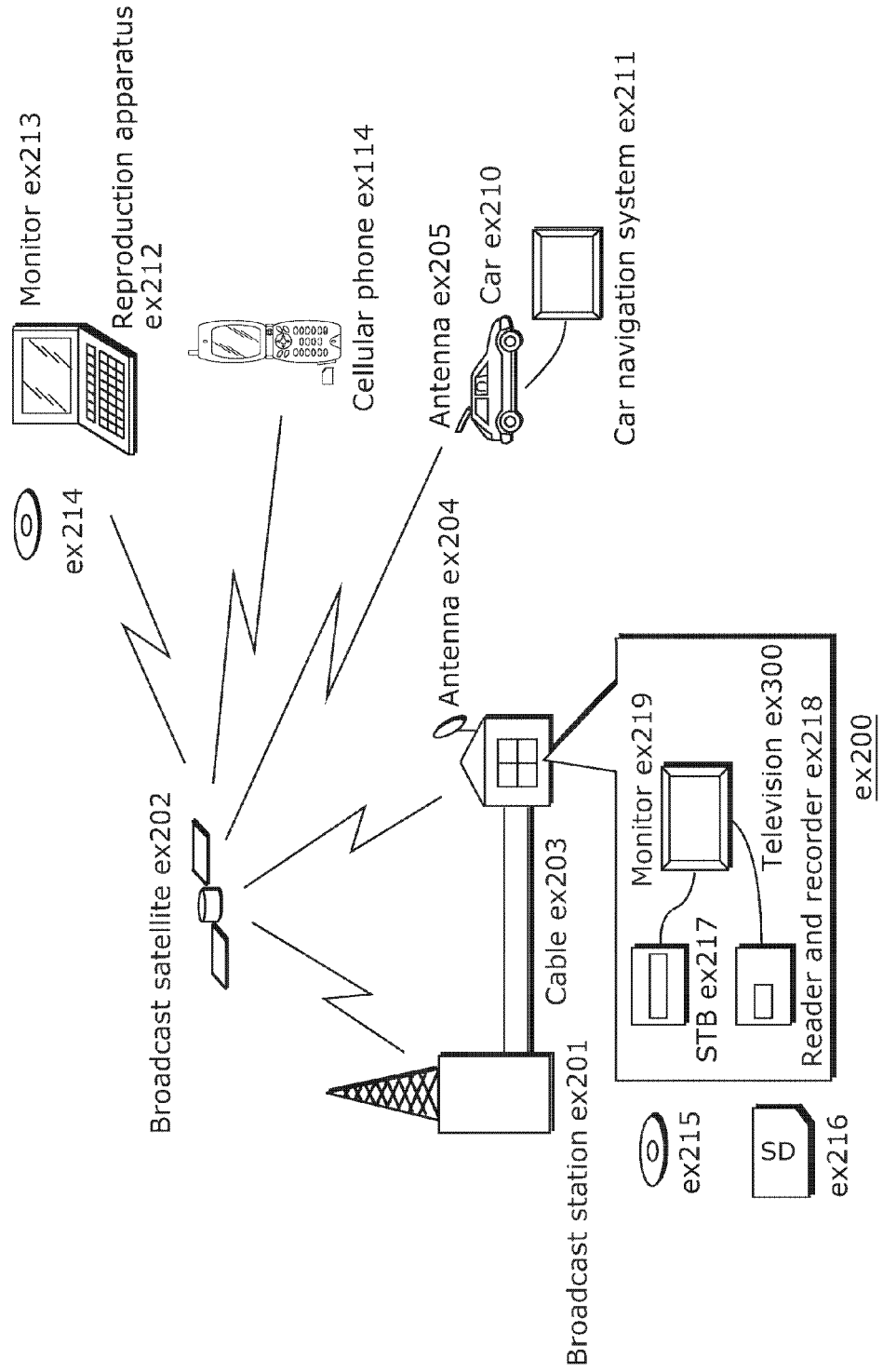
FIG. 17 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 17. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 18:
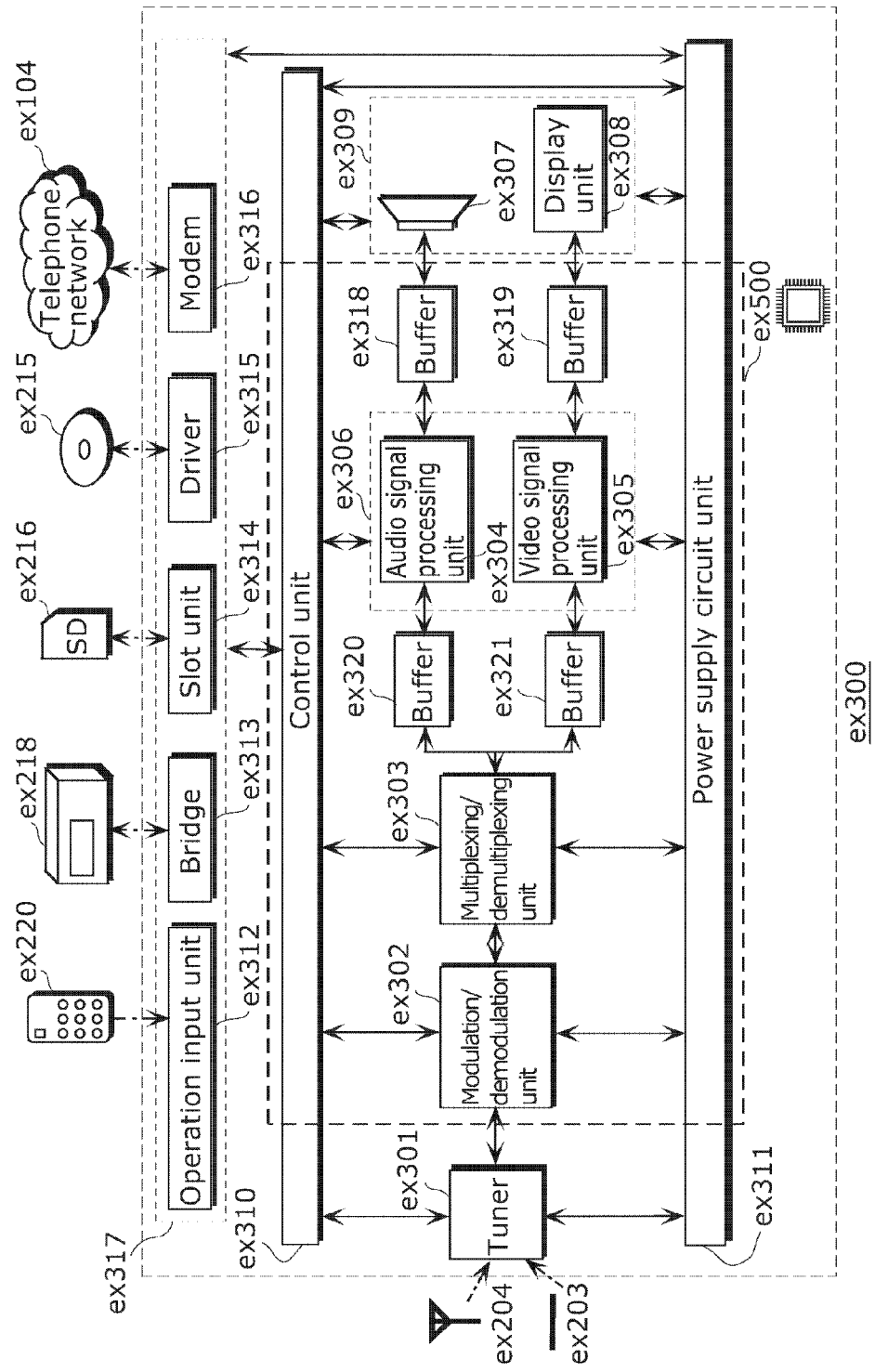
FIG. 18 shows a block diagram illustrating an example of a configuration of a television.

FIG. 18 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 19:
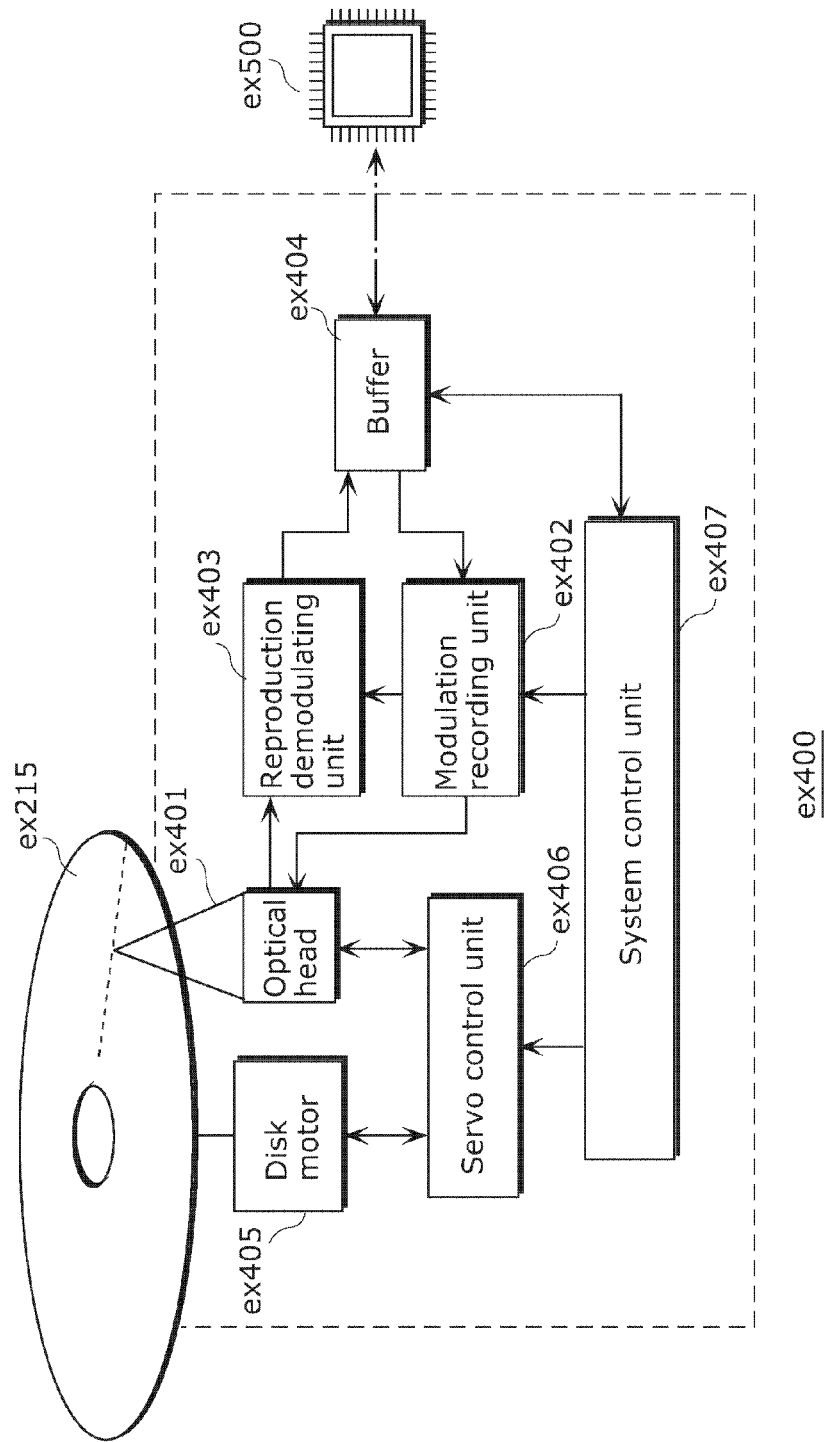
FIG. 19 shows a block diagram illustrating an example of a configuration of an information reproducing/recording unit that reads and writes information from and on a recording medium that is an optical disk.

As an example, FIG. 19 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 20:
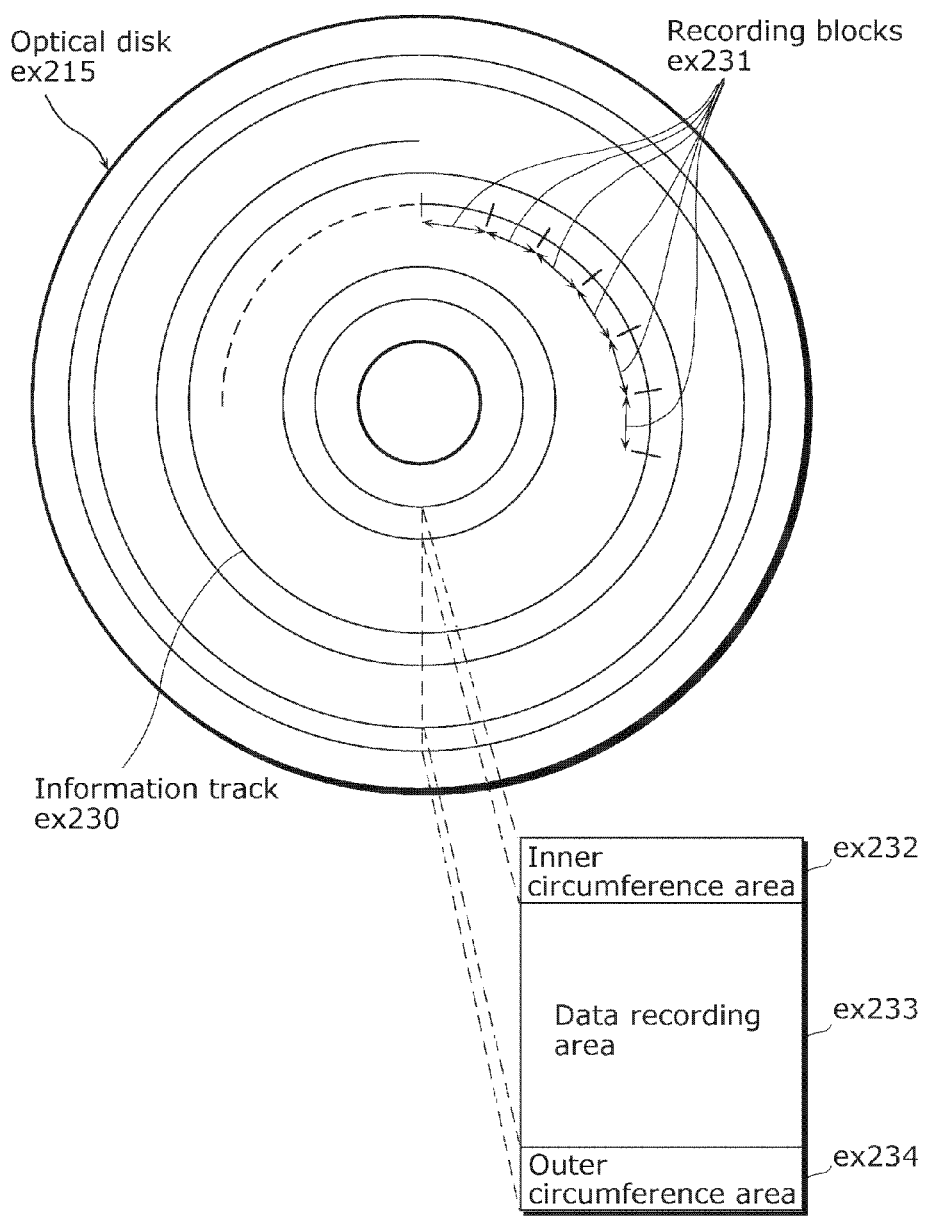
FIG. 20 shows an example of a configuration of a recording medium that is an optical disk.

FIG. 20 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 18. The same will be true for the configuration of the computer ex111, the cellular phone ex114, and others.

Figure 21A:
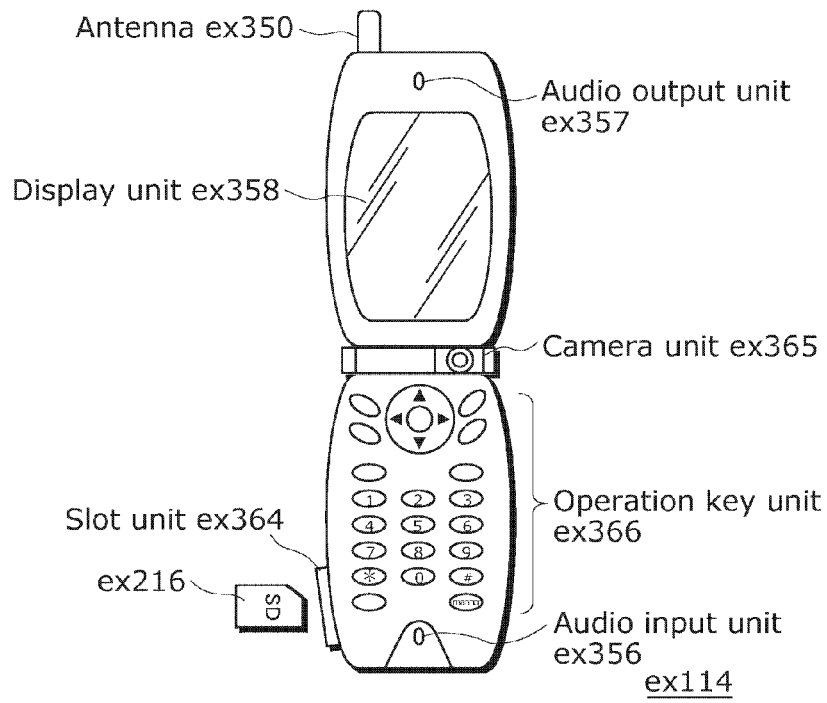
FIG. 21A shows an example of a cellular phone.

FIG. 21A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 21B:
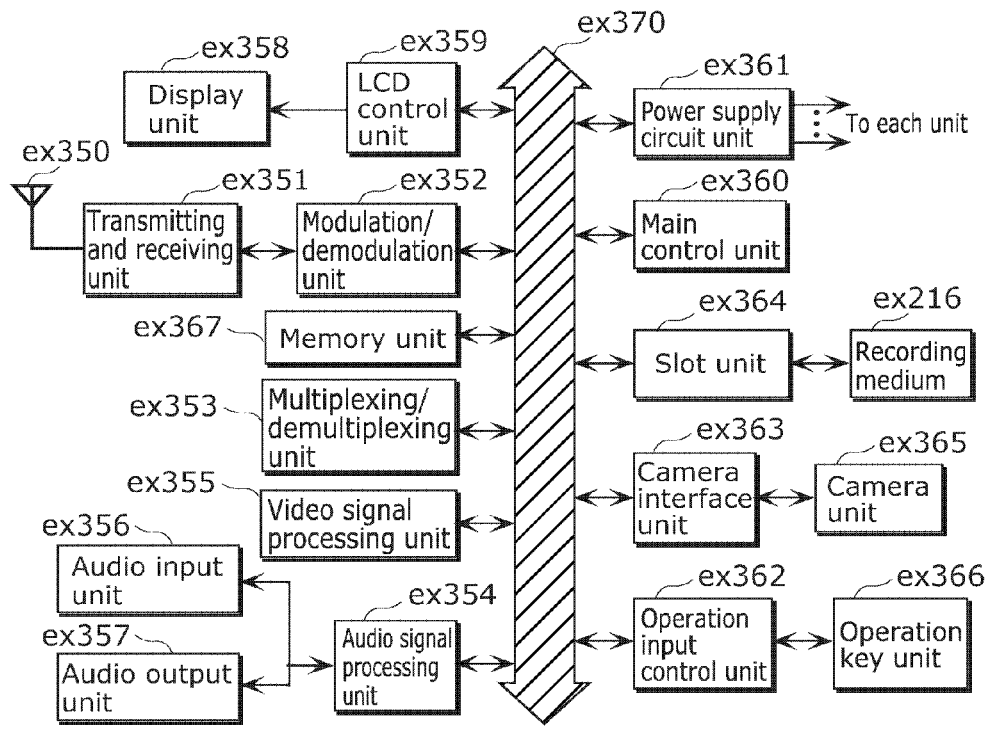
FIG. 21B is a block diagram showing an example of a configuration of a cellular phone.

Next, an example of a configuration of the cellular phone ex114 will be described with reference to FIG. 21B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, various modifications and revisions can be made in any of the embodiments in the present disclosure.

Embodiment 6

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 22 illustrates a structure of the multiplexed data. As illustrated in FIG. 22, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 23:
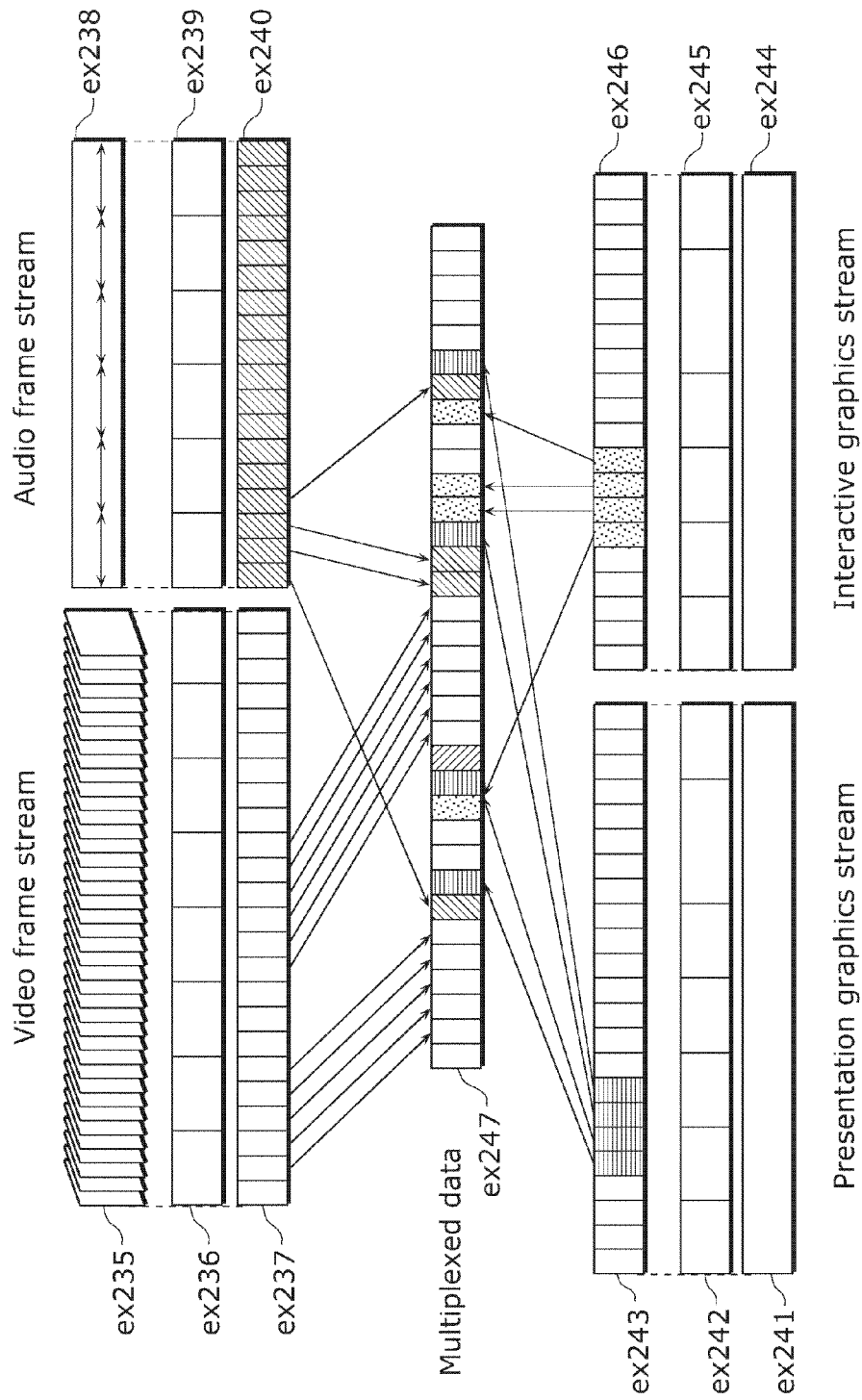
FIG. 23 schematically shows how each stream is multiplexed in multiplexed data.

FIG. 23 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 24:
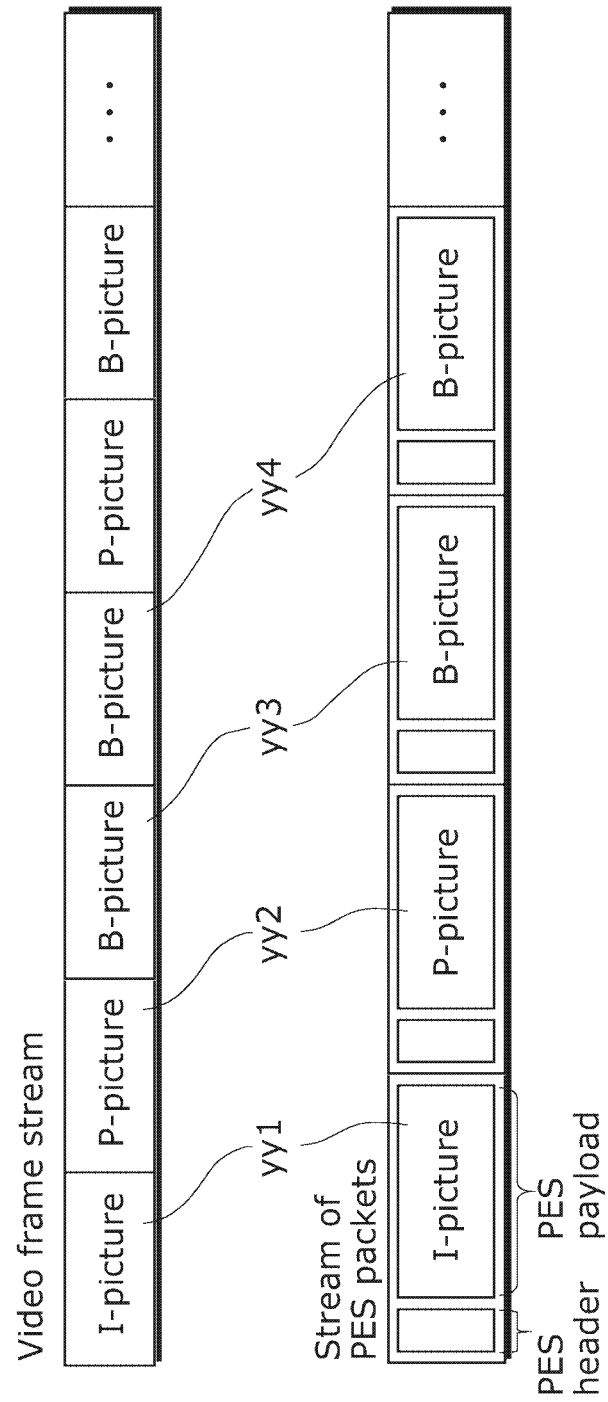
FIG. 24 shows how a video stream is stored in a stream of PES packets in more detail.

FIG. 24 illustrates how a video stream is stored in a stream of PES packets in more detail. The first bar in FIG. 24 shows a video frame stream in a video stream. The second bar shows the stream of PES packets. As indicated by arrows denoted as yy1, yy2, yy3, and yy4 in FIG. 24, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 25:
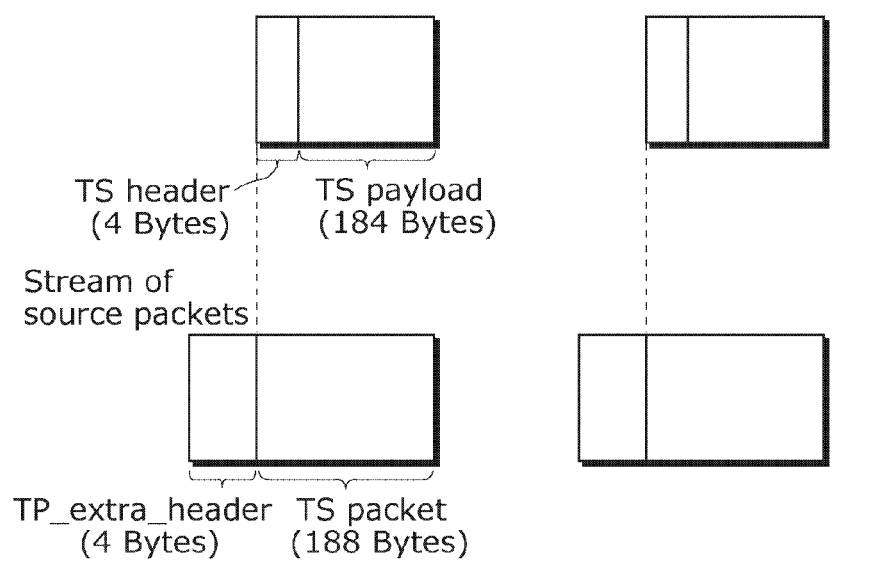
FIG. 25 shows a structure of TS packets and source packets in the multiplexed data.
Figure 25:
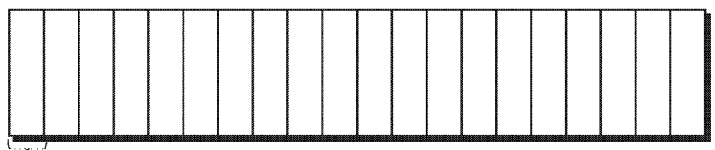

FIG. 25 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 25. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 26:
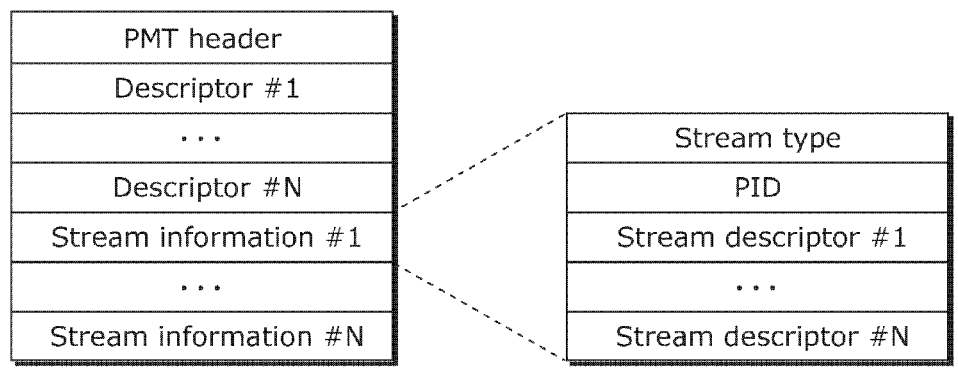
FIG. 26 shows a data structure of a PMT.

FIG. 26 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 27:
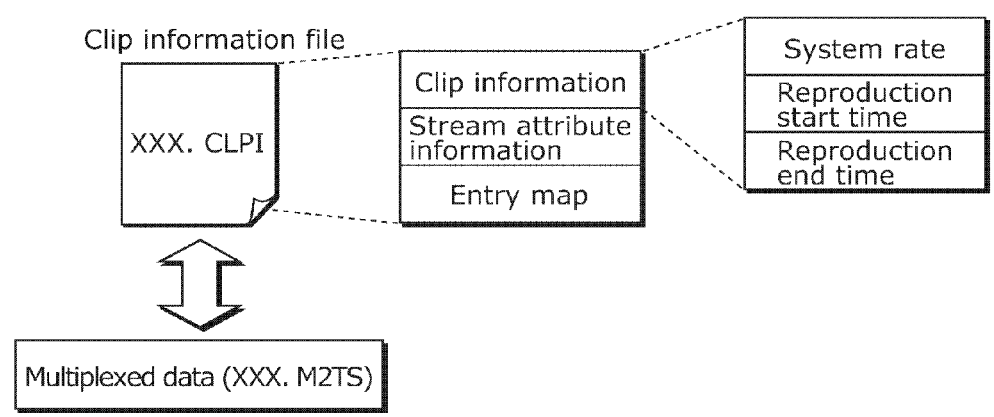
FIG. 27 shows an internal structure of multiplexed data information.

Each of the multiplexed data information files is management information of the multiplexed data as shown in FIG. 27. The multiplexed data information files are in one to one correspondence with the multiplexed data, and each of the files includes multiplexed data information, stream attribute information, and an entry map.

As illustrated in FIG. 27, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 28:
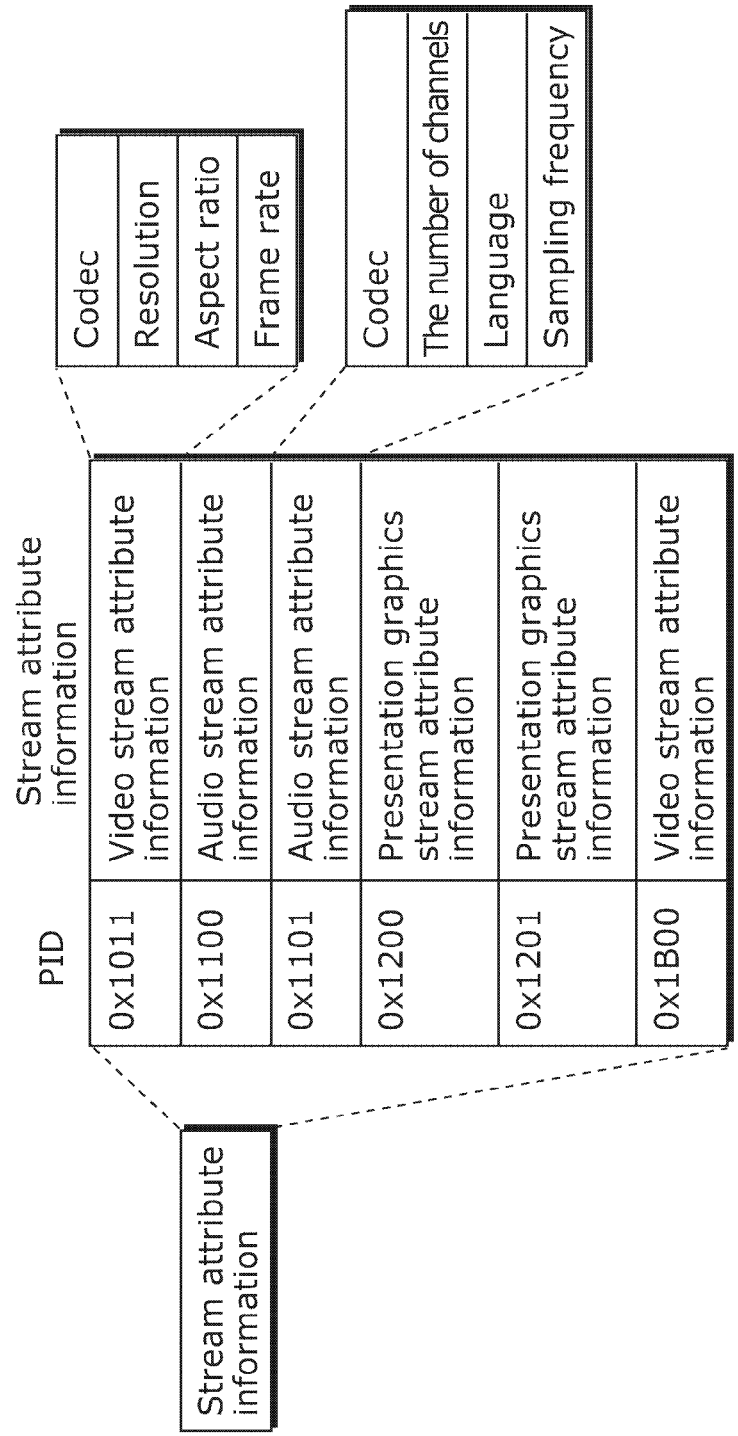
FIG. 28 shows an internal structure of stream attribute information.

As shown in FIG. 28, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 29:
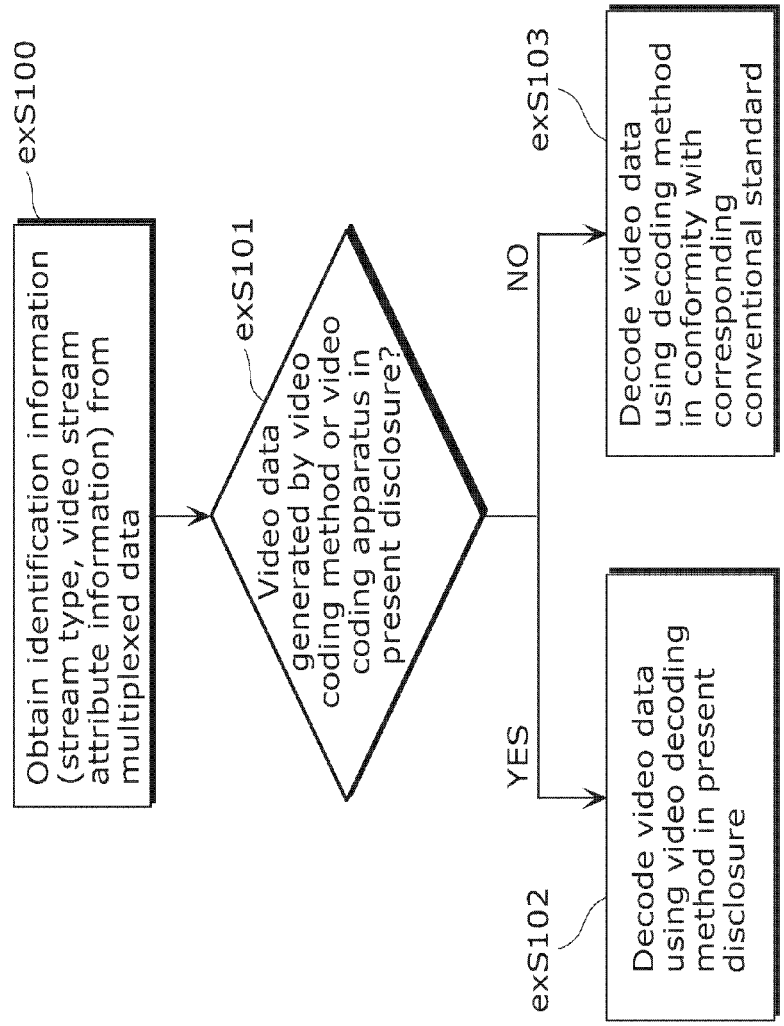
FIG. 29 shows steps for identifying video data.

Furthermore, FIG. 29 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 7

Figure 30:
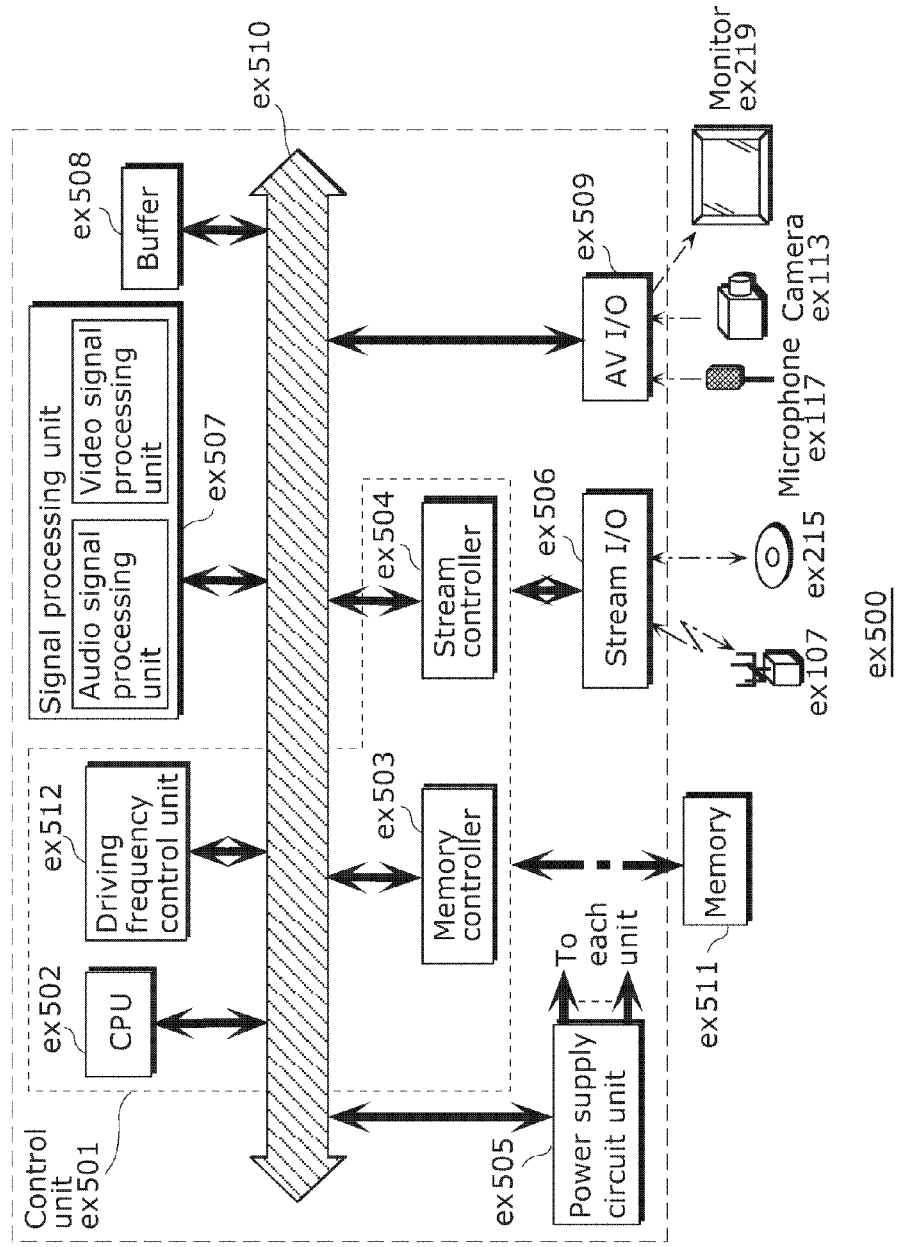
FIG. 30 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 30 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV 10 ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream 10 ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 8

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 31:
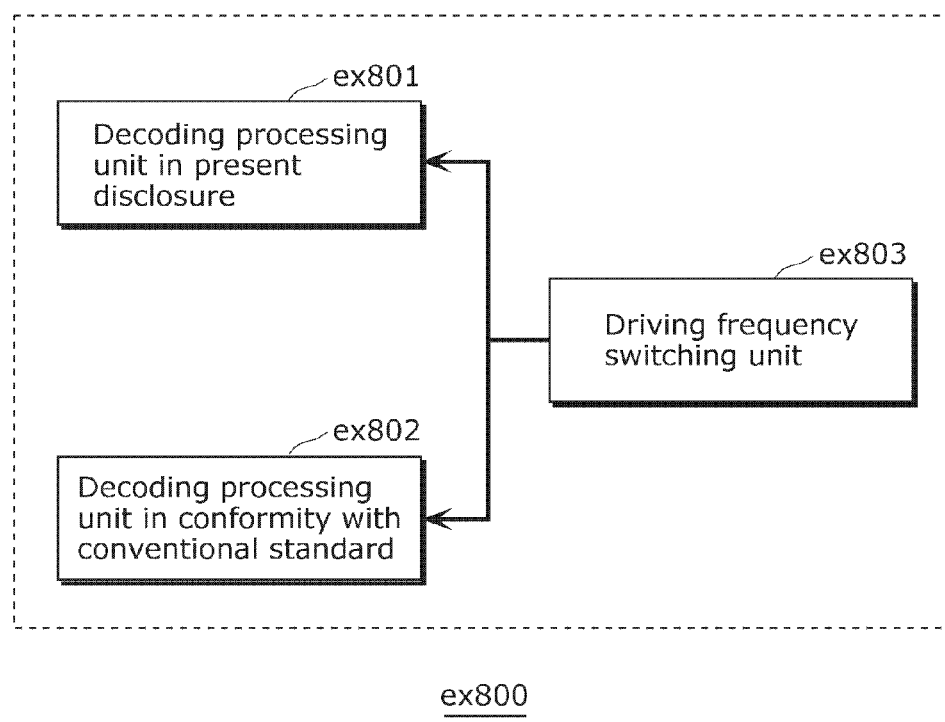
FIG. 31 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 31 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 30. Here, each of the decoding processing unit ex801 that executes the moving picture decoding method described in each of embodiments and the decoding processing unit ex802 that conforms to the conventional standard corresponds to the signal processing unit ex507 in FIG. 30. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 6 is probably used for identifying the video data. The identification information is not limited to the one described in Embodiment 6 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 33. The driving frequency can be selected by storing the look-up table in the buffer ex508 and in an internal memory of an LSI, and with reference to the look-up table by the CPU ex502.

Figure 32:
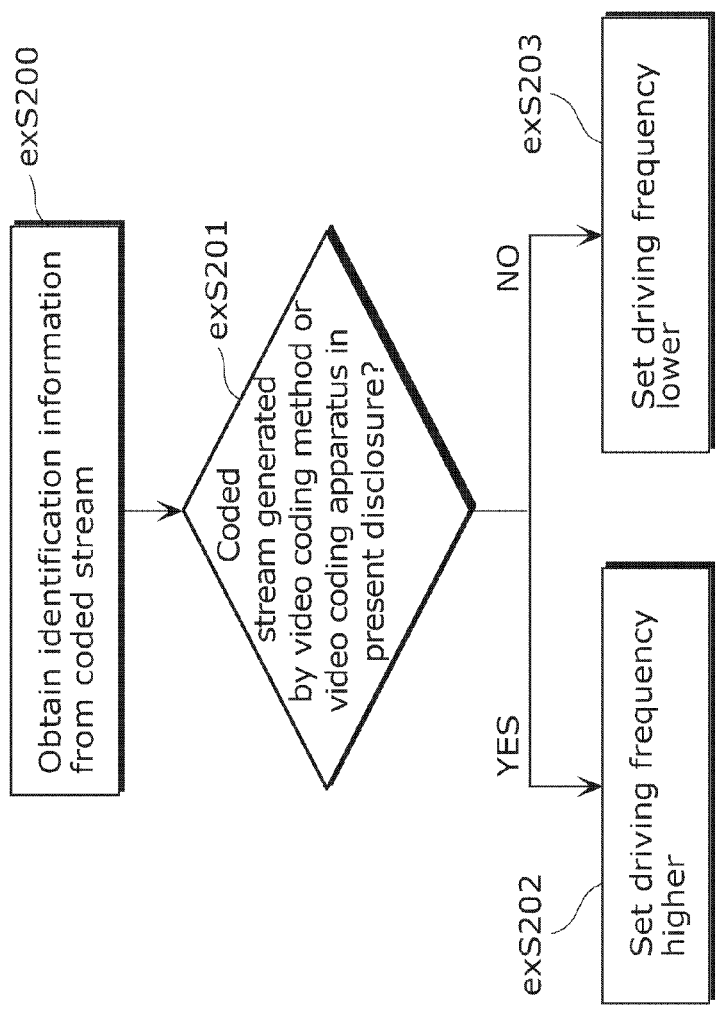
FIG. 32 shows steps for identifying video data and switching between driving frequencies.

FIG. 32 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 9

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 34A:
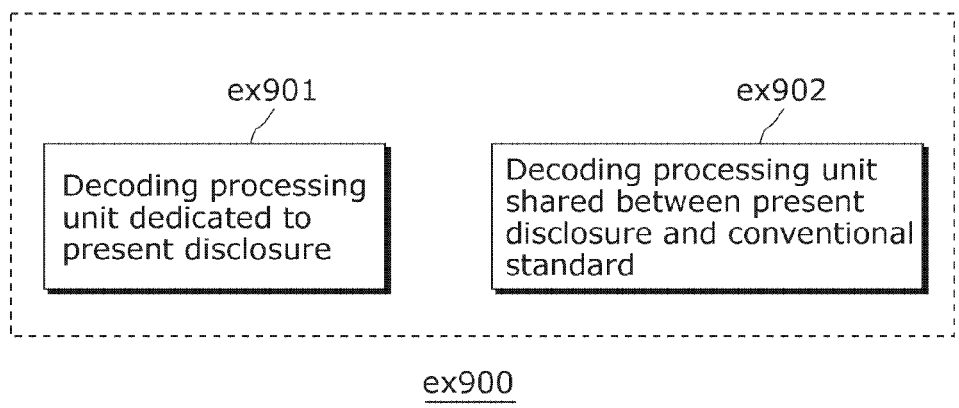
FIG. 34A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 34A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. Since the aspect of the present disclosure is characterized by inter prediction in particular, for example, the dedicated decoding processing unit ex901 is used for inter prediction. Otherwise, the decoding processing unit is probably shared for one of the entropy decoding, deblocking filtering, and inverse quantization, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 34B:
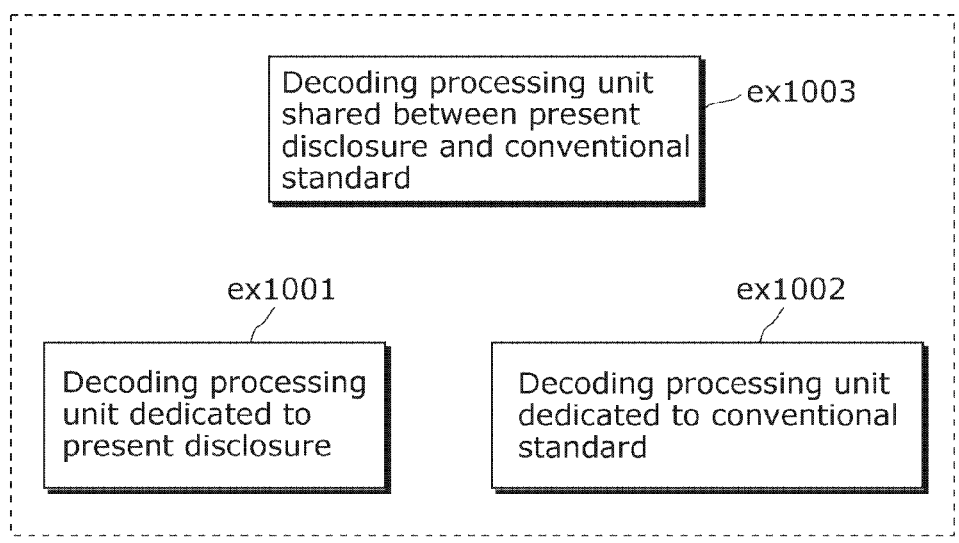
FIG. 34B is a diagram showing another example of a configuration for sharing a module of the signal processing unit.

Furthermore, ex1000 in FIG. 34B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

INDUSTRIAL APPLICABILITY

The image coding apparatuses and methods according to one or more exemplary embodiments disclosed herein are applicable to television receivers, digital video decoders, car navigation systems, mobile phones, digital cameras, digital video cameras, and the like.

The invention claimed is:
1. A system comprising:
at least one processor; and
storage coupled to the at least one processor,
wherein the at least one processor is configured to transmit a bitstream in the storage to a device based on a request for the bitstream, the bitstream being generated by performing a coding process on each block among blocks of pictures,
wherein the coding process includes:
deriving a candidate for a motion vector predictor to be used in encoding of a motion vector for a current block to be encoded, from a first motion vector for a neighboring block which is included in a current picture including the current block and is adjacent to the current block;
adding the derived candidate to a list of candidates;
selecting one motion vector predictor from the list of candidates; and
encoding the current block using the motion vector for the current block and a reference picture for the current block, and encoding the motion vector for the current block using the selected motion vector predictor, wherein the deriving includes:
> determining whether the reference picture for the current block is a long-term reference picture or a short-term reference picture, and whether a first reference picture for the neighboring block is a long-term reference picture or a short-term reference picture;
> deriving the candidate from the first motion vector without scaling based on a temporal distance when each of the reference picture for the current block and the first reference picture for the neighboring block is determined to be a long-term reference picture; and
> deriving the candidate from the first motion vector by scaling based on a temporal distance when each of the reference picture for the current block and the first reference picture for the neighboring block is determined to be a short-term reference picture, and wherein the encoding further includes encoding classification information for determining whether or not the reference picture of the current picture is a long-term reference picture.

2. The system according to claim 1,
wherein the bitstream is one of a plurality of bitstreams corresponding to the request in the storage.

3. The system according to claim 2,
wherein the bitstream is compliant with a first standard which is one of codec standards, and
wherein another one of the plurality of bitstreams is compliant with a second standard which is another one of the codec standards.

4. A contents management method for a system including a first apparatus, a second apparatus, and a server, the method comprising:
> storing a bitstream from the first apparatus, the bitstream being generated by performing a coding process on each block among blocks of pictures in the server;
> receiving a request for the bitstream from the second apparatus;
> providing the bitstream to the second apparatus from the server, wherein the coding process includes:
> deriving a candidate for a motion vector predictor to be used in encoding of a motion vector for a current block to be encoded, from a first motion vector for a neighboring block which is included in a current picture including the current block and is adjacent to the current block;
> adding the derived candidate to a list of candidates;
> selecting one motion vector predictor from the list of candidates; and
> encoding the current block using the motion vector for the current block and a reference picture for the current block, and encoding the motion vector for the current block using the selected motion vector predictor, wherein the deriving includes:
> determining whether the reference picture for the current block is a long-term reference picture or a short-term reference picture, and whether a first reference picture for the neighboring block is a long-term reference picture or a short-term reference picture;
> deriving the candidate from the first motion vector without scaling based on a temporal distance when each of the reference picture for the current block and the first reference picture for the neighboring block is determined to be a long-term reference picture; and
> deriving the candidate from the first motion vector by scaling based on a temporal distance when each of the reference picture for the current block and the first reference picture for the neighboring block is determined to be a short-term reference picture, and wherein the encoding further includes encoding classification information for determining whether or not the reference picture of the current picture is a long-term reference picture.

* * * * *